US012368548B2

(12) United States Patent
Yang et al.

(10) Patent No.: US 12,368,548 B2
(45) Date of Patent: *Jul. 22, 2025

(54) LONG TRAINING FIELD (LTF) IN DISTRIBUTED TRANSMISSION

(71) Applicant: QUALCOMM Incorporated, San Diego, CA (US)

(72) Inventors: Lin Yang, San Diego, CA (US); Bin Tian, San Diego, CA (US); Qifan Chen, Newark, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,008

(22) Filed: Jul. 3, 2024

(65) Prior Publication Data
US 2025/0007659 A1 Jan. 2, 2025

Related U.S. Application Data

(63) Continuation of application No. 18/323,333, filed on May 24, 2023, now Pat. No. 12,058,064, which is a
(Continued)

(51) Int. Cl.
*H04L 5/00* (2006.01)
*H04W 52/28* (2009.01)

(52) U.S. Cl.
CPC .......... *H04L 5/0041* (2013.01); *H04L 5/0048* (2013.01); *H04L 5/0069* (2013.01); *H04W 52/286* (2013.01)

(58) Field of Classification Search
CPC ..... H04L 25/00; H04L 25/0204; H04L 27/26; H04L 25/0226; H04L 27/2613;
(Continued)

(56) References Cited

U.S. PATENT DOCUMENTS 9,768,921 B2 * 9/2017 Sun .......................... H04L 27/12
10,327,172 B2 * 6/2019 Lee ..................... H04L 25/0226
(Continued)

FOREIGN PATENT DOCUMENTS

WO   WO-2021034154 A1   2/2021
WO   WO-2021182744 A1   9/2021

OTHER PUBLICATIONS

Co-pending U.S. Appl. No. 18/323,333, inventor Yang; Lin, filed May 24, 2023.
(Continued)

*Primary Examiner* — Jung Liu
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to LTF designs that support distributed transmissions. In some aspects, a transmitting device may obtain a sequence of values representing an LTF of a PPDU and may map the sequence of values to a number (N) of noncontiguous subcarrier indices of a plurality of subcarrier indices spanning a wireless channel according to a distributed tone plan. In some implementations, the transmitting device may modulate the sequence of values on N tones, representing a logical RU, and map the N tones to the N noncontiguous subcarrier indices, respectively. In some other implementations, the sequence of values may be obtained based on relative locations of the N noncontiguous subcarrier indices in the wireless channel.

20 Claims, 21 Drawing Sheets

Related U.S. Application Data continuation of application No. 17/493,815, filed on Oct. 4, 2021, now Pat. No. 11,711,184.

(58) Field of Classification Search
CPC .............. H04L 27/2614; H04L 1/0643; H04L 27/26132; H04L 27/262; H04L 5/0048; H04W 28/065; H04W 72/044; H04W 84/12; H04B 7/0452

See application file for complete search history.

(56) References Cited

U.S. PATENT DOCUMENTS

| | | | |
|---|---|---|---|
| 10,834,674 | B1 | 11/2020 | Cao et al. |
| 11,265,873 | B2* | 3/2022 | Xue .................... H04L 27/2613 |
| 11,711,184 | B2 | 7/2023 | Yang et al. |
| 2016/0286551 | A1 | 9/2016 | Lee et al. |
| 2020/0169996 | A1* | 5/2020 | Xue .................... H04L 27/2613 |
| 2021/0068104 | A1 | 3/2021 | Chen et al. |
| 2021/0204204 | A1 | 7/2021 | Kim et al. |
| 2021/0211934 | A1* | 7/2021 | Lee ...................... H04L 27/2613 |
| 2023/0104295 | A1 | 4/2023 | Yang et al. |
| 2024/0007241 | A1 | 1/2024 | Yang |

OTHER PUBLICATIONS

International Search Report and Written Opinion—PCT/US2022/041076—ISA/EPO—Dec. 23, 2022.

Liu L., et al., (Huawei): "HE-LTF Sequence Design", IEEE 802.11-15/1334r1, 11-15-1334-01-00ax-he-ltf-Sequence-Design, IEEE Draft, 11-15-1334-01-00AX-HE-LTF-Sequence-Design, IEEE-SA Mentor, Piscataway, NJ USA, vol. 802.11ax, No. 1, Nov. 9, 2015, XP068099298, pp. 1-37, p. 15 p. 17 p. 21 p. 23 p. 26 p. 28.

Porat R., et al., (BROADCOM): "2x 320MHz EHT-LTF Design", IEEE Draft, IEEE 802.11-20/1311r2, 11-20-1311-02-00BE-2X-320MHZ-LTF-Design, IEEE-SA Mentor, Piscataway, NJ USA, vol. 802.11 EHT, 802.11be, No. 2, Sep. 9, 2020, XP068173014, pp. 1-12, p. 2-p. 3 p. 6 p. 10-p. 11.

* cited by examiner

EHT-LTF$_{dRU}$ (-512:511)@80MHz =
[ 0  0  0  0  0  0  0  0  0  0  0  0  0 -1  1  1 -1  1  1  1 -1 -1  1 -1  1  1...
  1 -1  1  1 -1 -1 -1  1 -1  1  1 -1 -1  1  1 -1 -1  1  1  1  1 -1  1  1 -1 -1...
  1 -1 -1  1 -1  1 -1 -1  1 -1 -1 -1  1 -1 -1  1 -1 -1 -1  1  1  1  1 -1 -1 -1...
  1  1 -1  1 -1  1 -1 -1  1 -1 -1 -1 -1 -1 -1 -1  1  1 -1 -1 -1 -1  1 -1 -1  1...
  1  1  1 -1 -1 -1  1 -1 -1 -1  1 -1  1  1 -1 -1  1 -1  1 -1 -1  1  1  1  1 -1...
 -1 -1 -1 -1 -1 -1  1 -1 -1  1 -1  1 -1  1  1 -1 -1  1 -1 -1  1  1  1 -1  1  1...
 -1  1  1 -1 -1 -1 -1 -1  1  1  1  1  1 -1 -1 -1  1  1 -1  1 -1  1  1 -1  1 -1...
  1  1  1 -1  1  1  1  1  1  1 -1 -1 -1 -1 -1 -1  1  1  1  1  1  1 -1 -1 -1 -1...
  1 -1  1 -1  1 -1 -1 -1  1  1  1 -1  1  1 -1 -1 -1  1 -1  1  1  1 -1 -1 -1  1...
 -1  1 -1 -1  1 -1  1 -1 -1 -1 -1 -1  1 -1 -1  1  1  1 -1  1  1  1  1  1 -1  1...
  1 -1 -1  1  1 -1  1 -1  1 -1 -1  1 -1 -1  1 -1 -1 -1  1  1 -1  1  1  1  1 -1...
  1  1 -1  1  1 -1  1  1  1 -1 -1  1 -1  1 -1  1 -1  1 -1 -1  1  1 -1  1  1  1...
  1  1 -1  1  1 -1  1  1  1 -1  1  1  1 -1 -1 -1  1  1  1  1 -1  1 -1 -1 -1...
 -1 -1  1  1  1 -1 -1  1 -1  1 -1  1  1 -1  1  1  1  1 -1  1  1  1 -1 -1 -1  1...
 -1  1  1 -1 -1  1 -1 -1  1 -1  1  1 -1  1 -1 -1 -1 -1 -1 -1 -1 -1 -1 -1 -1  1...
 -1  1 -1 -1 -1 -1 -1  1 -1 -1 -1 -1  1  1 -1 -1  1  1  1  1  1 -1 -1  1  1  1...
 -1 -1  1 -1  1  1  1 -1  1 -1 -1  1 -1  1 -1  1  1 -1  1 -1  1  1  1 -1  1  1...
  1 -1  1 -1  1 -1  1  1 -1  1 -1  1  1 -1 -1  1  1  1  1 -1  1  1 -1  1 -1  1...
 -1 -1  1  1 -1 -1  1  1  1  1 -1 -1 -1  1  1  1  1  1  1 -1  1  1 -1 -1  1 -1...
 -1  1 -1  0  0  0  0  0  0  0  0  0  0  0  0  0  0  0  0  0  0  0  0  0  0  0...
  0  0  0  0  0  0  0  0  1  1  1  1  1 -1  1 -1  1  1  1  1  1  1 -1  1  1...
 -1 -1 -1  1 -1  1 -1  1  1 -1  1 -1  1  1  1  1  1  1  1  1  1  1  1  1  1...
  1  1  1  1  1  1 -1 -1  1  1  1  1  1 -1  1  1 -1 -1 -1  1  1 -1  1 -1...
  1 -1 -1 -1 -1  1 -1  1 -1 -1 -1 -1 -1 -1  1 -1 -1  1 -1 -1  1 -1  1 -1...
 -1 -1  1 -1  1 -1 -1  1  1  1  1  1 -1  1  1  1  1  1 -1  1  1 -1 -1  1...
 -1 -1 -1  1 -1  1  1  1 -1 -1  1  1 -1  1 -1 -1  1  1 -1  1  1 -1  1 -1 -1  1...
 -1 -1 -1 -1 -1 -1  1  1 -1 -1  1  1  1  1  1 -1  1 -1  1 -1 -1 -1 -1  1 -1...
 -1 -1 -1 -1 -1  1  1  1 -1 -1  1 -1  1  1  1 -1  1 -1  1  1 -1 -1 -1 -1 -1...
 -1 -1  1 -1 -1 -1 -1  1 -1 -1 -1  1 -1 -1 -1 -1  1 -1 -1 -1 -1 -1  1  1 -1...
 -1 -1 -1 -1 -1  1 -1 -1 -1 -1 -1 -1 -1  1  1  1 -1  1  1 -1 -1  1 -1  1 -1 -1...
  1  1  1 -1 -1 -1  1 -1 -1 -1 -1  1  1 -1  1 -1  1  1  1  1  1 -1 -1 -1 -1 -1...
 -1 -1  1 -1  1 -1  1  1  1  1  1  1 -1  1 -1 -1 -1 -1  1 -1  1  1  1 -1 -1...
 -1 -1  1 -1  1 -1  1  1  1  1 -1  1 -1 -1 -1 -1 -1  1  1 -1 -1  1 -1 -1...
 -1 -1  1 -1  1 -1 -1  1 -1  1 -1 -1 -1 -1 -1  1 -1 -1 -1 -1 -1 -1 -1 -1  1...
 -1 -1  1 -1  1 -1 -1  1 -1  1 -1 -1  1 -1 -1 -1  1  1 -1  1 -1  1 -1...
 -1  1  1  1 -1  1 -1 -1  1  1 -1  1 -1 -1  1 -1  1  1  1 -1 -1 -1  1...
  1 -1  1  1  1  1 -1  1 -1  1 -1  1  1  1  1 -1  1  1  1  1  1  1  1...
  1  1 -1 -1 -1 -1  1 -1 -1 -1 -1  1  1 -1 -1 -1 -1  1  1  1 -1  1 -1 -1...
 -1 -1 -1  1  1 -1 -1 -1 -1 -1 -1 -1  1 -1  1 -1  1  1  1  1  1  1  0...
  0  0  0  0  0  0  0  0  0  0 ]

*Figure 16*

LONG TRAINING FIELD (LTF) IN DISTRIBUTED TRANSMISSION

CROSS REFERENCE

The present Application for Patent is a Continuation of U.S. Non-Provisional patent application Ser. No. 18/323,333, by YANG et al., entitled "LONG TRAINING FIELD (LTF) IN DISTRIBUTED TRANSMISSION," filed May 24, 2023, which is a Continuation of U.S. Non-Provisional patent application Ser. No. 17/493,815 (now patented, U.S. Pat. No. 11,711,184), by YANG et al., entitled "LONG TRAINING FIELD (LTF) IN DISTRIBUTED TRANSMISSION," filed Oct. 4, 2021, assigned to the assignee hereof, and the contents of which are expressly incorporated by reference herein in their entirety.

TECHNICAL FIELD

This disclosure relates generally to wireless communication, and more specifically to long training fields (LTFs) in distributed transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include obtaining a sequence of values representing a long training field (LTF) of a physical (PHY) layer convergence protocol (PLCP) protocol data unit (PPDU); mapping the sequence of values to a number (N) of noncontiguous subcarrier indices of a plurality of subcarrier indices spanning a wireless channel according to a distributed tone plan; and transmitting the PPDU, including the sequence of values mapped to the N noncontiguous subcarrier indices, over the wireless channel.

In some aspects, the mapping of the sequence of values to the N noncontiguous subcarrier indices may include modulating the sequence of values on N tones representing a logical resource unit (RU) associated with a non-distributed tone plan and mapping the N tones to the N noncontiguous subcarrier indices, respectively. In some implementations, the sequence of values may be an LTF sequence associated with the non-distributed tone plan. In some implementations, the non-distributed tone plan may be a legacy tone plan. In some other implementations, the non-distributed tone plan may be a non-legacy tone plan.

In some aspects, the sequence of values may be configured for transmission on an N-tone distributed RU (dRU) based on a peak-to-average power ratio (PAPR) associated with the transmission of the dRU. In some aspects, the sequence of values may be obtained based on relative locations of the N noncontiguous subcarrier indices in the wireless channel. In some implementations, the sequence of values may be a subset of an LTF sequence that maps to the plurality of subcarrier indices according to a non-distributed tone plan. In some other implementations, the sequence of values may be a subset of an LTF sequence that maps to the plurality of subcarrier indices according to the distributed tone plan.

In some aspects, the LTF sequence may include one or more 26-tone base sequences each configured for transmission on a respective 26-tone dRU based on a PAPR associated with a transmission of the LTF sequence. In some implementations, portions of the LTF sequence that map to 26-tone dRUs may have the same relative pilot tone locations are associated with different base sequences. In some implementations, the one or more 26-tone base sequences ($LTF_{dRU26}$) may form larger base sequences associated with the LTF sequence, where:

$$LTF_{dRU52,1} = \gamma_1 * LTF_{dRU26,1} + \gamma_2 * LTF_{dRU26,2}$$
$$LTF_{dRU52,2} = \gamma_3 * LTF_{dRU26,3} + \gamma_4 * LTF_{dRU26,4}$$
$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence; where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRU52,1}$ and $LTF_{dRU52,2}$, respectively), and $LTF_{add\_tones}$ are LTF values on additional tones of a 106-tone base sequence ($LTF_{dRU106}$), based on the PAPR associated with the transmission of the LTF sequence.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including obtaining a sequence of values representing an LTF of a PPDU; mapping the sequence of values to a number (N) of noncontiguous subcarrier indices of a plurality of subcarrier indices spanning a wireless channel according to a distributed tone plan; and transmitting the PPDU, including the sequence of values mapped to the N noncontiguous subcarrier indices, over the wireless channel.

Another innovative aspect of the subject matter described in this disclosure can be implemented as a method of wireless communication. The method may be performed by a wireless communication device, and may include receiving a PPDU over a wireless channel; demapping a sequence of values from a number (N) of noncontiguous subcarrier indices of a plurality of subcarrier indices spanning the wireless channel according to a distributed tone plan, where the sequence of values represents an LTF of the PPDU; and estimating the wireless channel based on the sequence of values.

In some aspects, the demapping of the sequence of values may include demapping N tones from the N noncontiguous subcarrier indices, respectively, where the demapped N tones represent a logical RU associated with a non-distributed tone plan; and demodulating the sequence of values from the N tones. In some implementations, the sequence of values may be an LTF sequence associated with the non-distributed tone plan. In some implementations, the non-distributed tone plan may be a legacy tone plan. In some other implementations, the non-distributed tone plan may be a non-legacy tone plan.

In some aspects, the sequence of values may be configured for transmission on an N-tone dRU based on a PAPR associated with the transmission of the dRU. In some aspects, the sequence of values may be associated with relative locations of the N noncontiguous subcarrier indices in the wireless channel. In some implementations, the sequence of values may be a subset of an LTF sequence that maps to the plurality subcarrier indices according to a non-distributed tone plan. In some other implementations, the sequence of values may be a subset of an LTF sequence that maps to the plurality of subcarrier indices according to the distributed tone plan.

In some aspects, the LTF sequence may include one or more 26-tone base sequences each configured for transmission on a respective 26-tone dRU based on a PAPR associated with a transmission of the LTF sequence. In some implementations, portions of the LTF sequence that map to 26-tone dRUs having the same relative pilot tone locations may be associated with different base sequences. In some implementations, the one or more 26-tone base sequences ($LTF_{dRU26}$) may form larger base sequences associated with the LTF sequence, where:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence; where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRU52,1}$ and $LTF_{dRU52,2}$, respectively), and $LTF_{add\_tones}$ are LTF values on additional tones of a 106-tone base sequence ($LTF_{dRU106}$), based on the PAPR associated with the transmission of the LTF sequence.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving a PPDU over a wireless channel; demapping a sequence of values from a number (N) of noncontiguous subcarrier indices of a plurality of subcarrier indices spanning the wireless channel according to a distributed tone plan, where the sequence of values represents an LTF of the PPDU; and estimating the wireless channel based on the sequence of values.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 11 shows an example long training field (LTF) sequence associated with a non-distributed tone plan.

FIG. 14 shows an example LTF sequence usable for distributed transmissions over a 20 MHz spreading bandwidth, according to some implementations.

FIG. 15 shows an example LTF sequence usable for distributed transmissions over a 40 MHz spreading bandwidth, according to some implementations.

FIG. 16 shows an example LTF sequence usable for distributed transmissions over an 80 MHz spreading bandwidth, according to some implementations.

Like reference numbers and designations in the various drawings indicate like elements.

DETAILED DESCRIPTION

Figure 1:
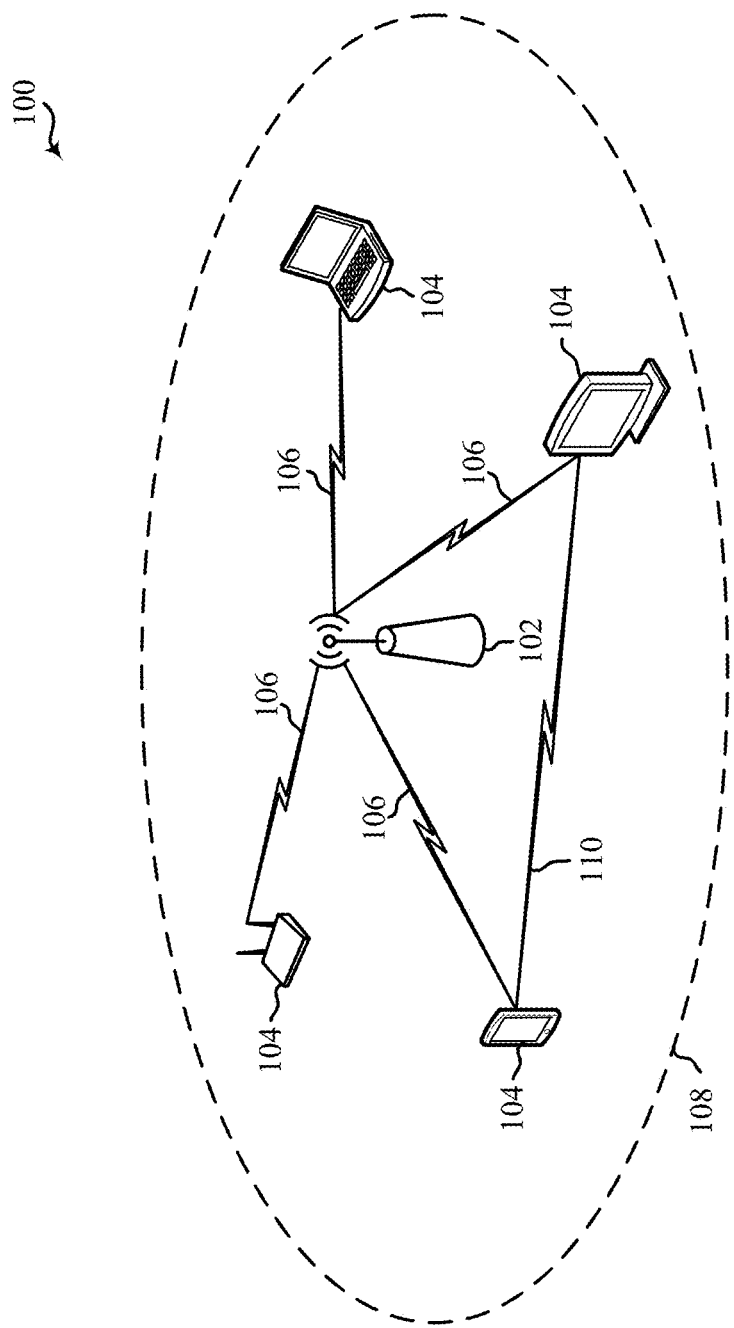
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As used herein, the term "distributed transmission" refers to physical layer convergence protocol (PLCP) protocol data unit (PPDU) transmissions on noncontiguous tones (or subcarriers) of a wireless channel (such as in accordance with a "distributed tone plan"). In contrast, the term "contiguous transmission" refers to PPDU transmissions on contiguous tones that represent resource units (RUs), as defined by existing versions of the IEEE 802.11 standard (also referred to as a "non-distributed tone plan"). Distributed transmissions provide greater flexibility in medium utilization for power spectral density (PSD)-limited wireless channels. As described above, the low power indoor (LPI) power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, distributed transmissions may increase the overall transmit power of the PPDU without exceeding the PSD limits of the wireless channel. For example, a distributed tone plan may reduce the total number of tones modulated by the device on any 1-MHz subchannel of the wireless channel. As a result, the wireless communication device may increase its per-tone transmit power without exceeding the PSD limits.

The IEEE 802.11 standard defines a PPDU format, to be used for wireless communication, which includes one or more long training fields (LTFs). LTFs are generally used for channel estimation purposes. For example, a transmitting device may transmit a known pattern of symbols, in an LTF, to a receiving device. The receiving device may use its knowledge of the symbol pattern in the received LTF (also referred to as an "LTF sequence") to estimate how wireless communications propagate through a wireless channel between the transmitting device and the receiving device. The receiving device may further use such channel estimations to recover the data in the data field of the PPDU more accurately. In a distributed transmission, the tones that carry the data are spread across a wider bandwidth (also referred to as a "spreading bandwidth") than would otherwise be used for a contiguous transmission. Because the LTF is used to estimate the wireless channel associated with the data portion of a PPDU, changing the tone plan used for data transmissions (such as from a non-distributed tone plan to a distributed tone plan) may require changes in LTF design. In other words, new LTF sequences or mappings may be needed to support distributed transmission of PPDUs.

Various aspects relate generally to distributed transmissions, and more particularly, to LTF designs that support distributed transmissions. In some aspects, a transmitting device may obtain a sequence of values representing an LTF of a PPDU and may map the sequence of values to a number (N) of noncontiguous subcarrier indices of a plurality of subcarrier indices spanning a wireless channel according to a distributed tone plan. In some implementations, the transmitting device may modulate the sequence of values on N tones, representing a logical RU, and map the N tones to the N noncontiguous subcarrier indices, respectively. In such implementations, the sequence of values may be an existing LTF sequence associated with a non-distributed tone plan (such as a legacy tone plan or a non-legacy tone plan). In some other implementations, the sequence of values may be obtained based on relative locations of the N noncontiguous subcarrier indices in the wireless channel. In other words, the sequence of values may be a subset of an LTF sequence that maps to the plurality of subcarrier indices spanning the wireless channel. In some implementations, the LTF sequence may be an existing LTF sequence associated with a non-distributed tone plan. In some other implementations, the LTF sequence may be a new LTF sequence configured for distributed transmissions in accordance with the distributed tone plan. For example, the LTF sequence may be configured to reduce a peak-to-average power ratio (PAPR) associated with the distributed transmissions.

Particular implementations of the subject matter described in this disclosure can be implemented to realize one or more of the following potential advantages. As described above, transmitting the data portion of a PPDU on noncontiguous tones of a wireless channel allows the transmitting device to increase the overall transmit power of the data without exceeding the PSD limits of the wireless channel. Transmitting the LTF of a PPDU on noncontiguous tones of a wireless channel (such as the same noncontiguous tones on which the data portion of the PPDU is transmitted) allows a receiving device to more accurately estimate the wireless channel associated with the data portion. By reusing existing LTF sequences associated with a non-distributed tone plan, aspects of the present disclosure may support distributed transmissions of LTFs with only minor changes to the IEEE 802.11 standard. However, aspects of the present disclosure recognize that such existing LTF sequences are optimized for contiguous transmissions and may therefore result in higher PAPR when used in distributed transmissions. High PAPR may distort the time-domain signal that carries the LTF values and may thus lead to inaccurate (or less accurate) channel estimations at the receiving device. By designing new LTF sequences tailored to the noncontiguous tone mappings associated with a distributed tone plan, aspects of the present disclosure may reduce or optimize the PAPR associated with distributed transmissions of LTFs in accordance with the distributed tone plan.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
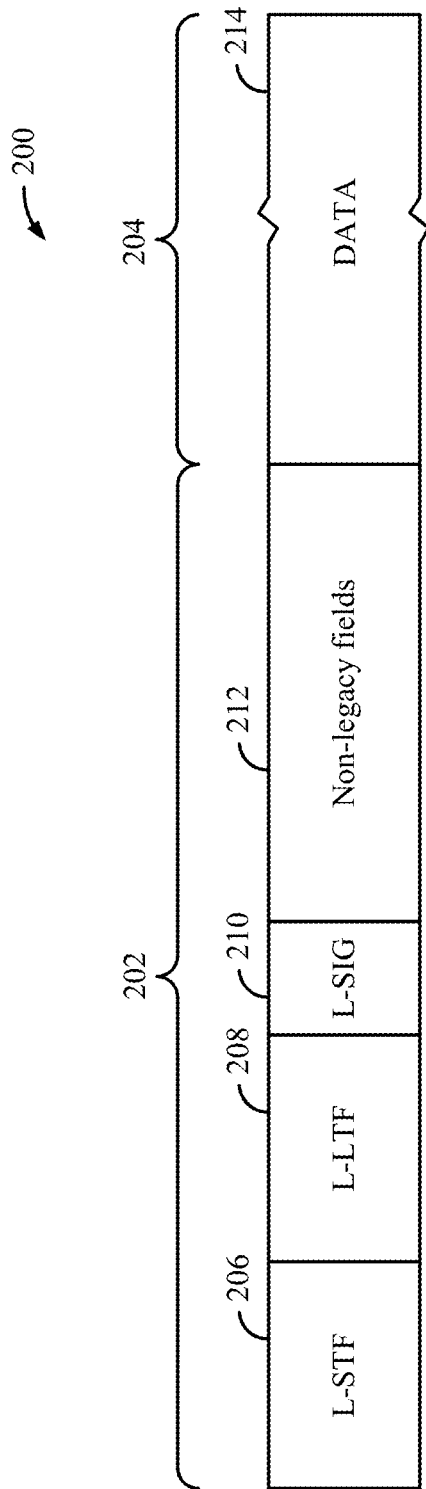
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
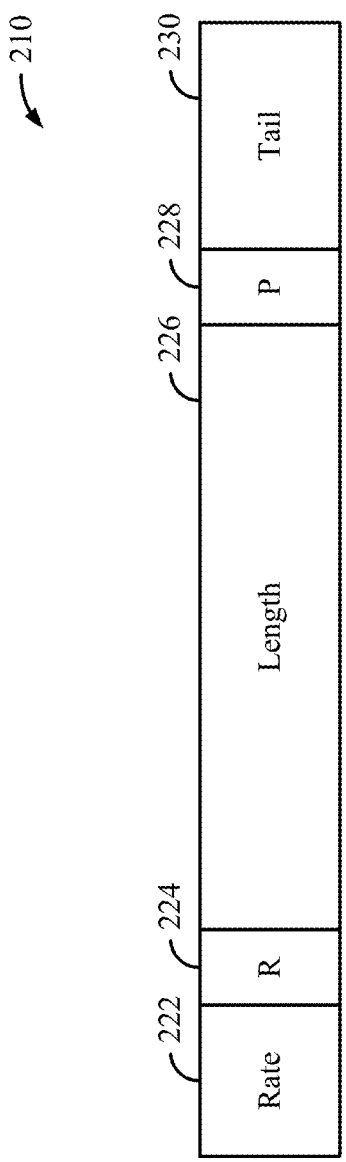
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (us) or other time units.

Figure 3:
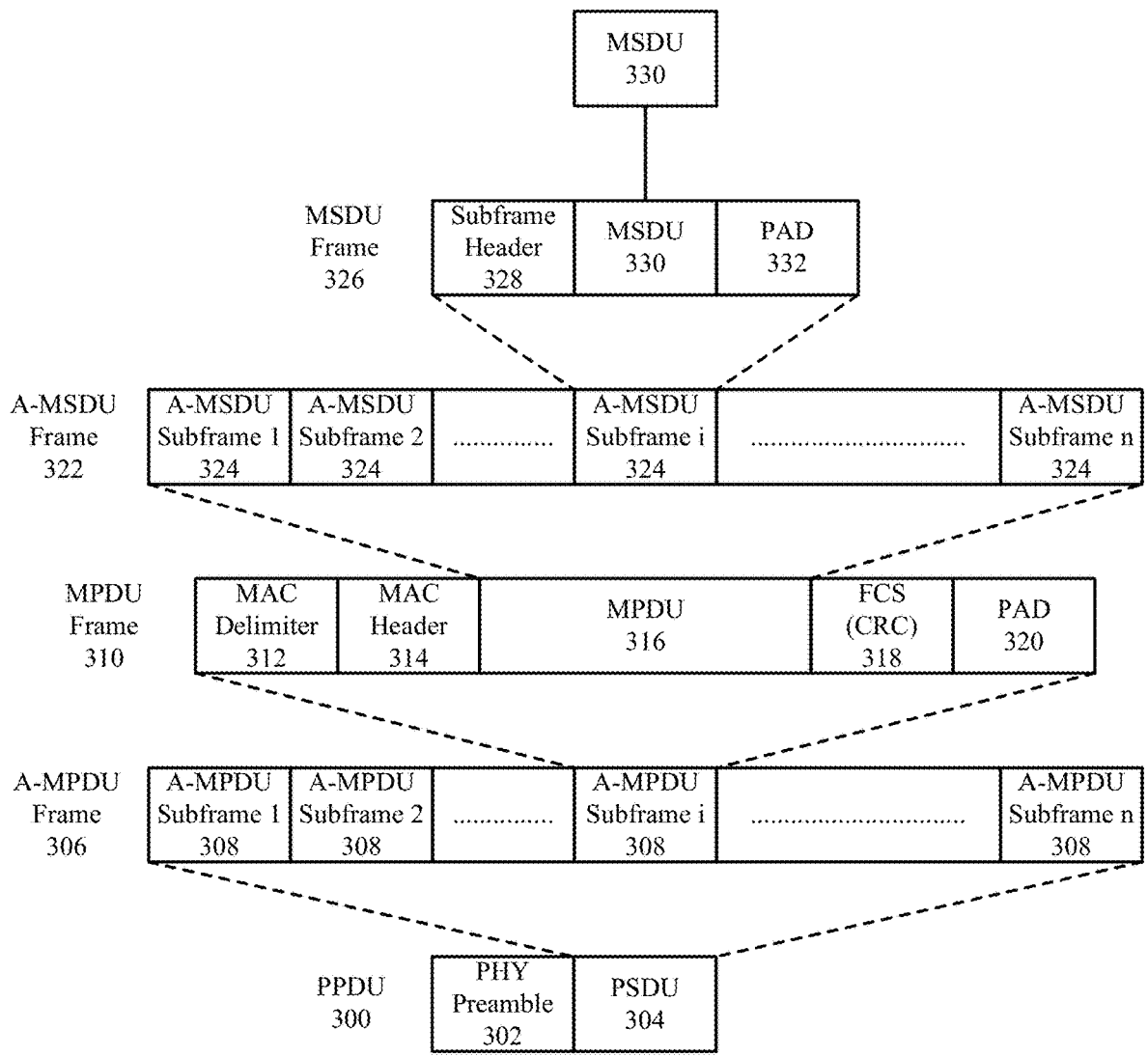
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
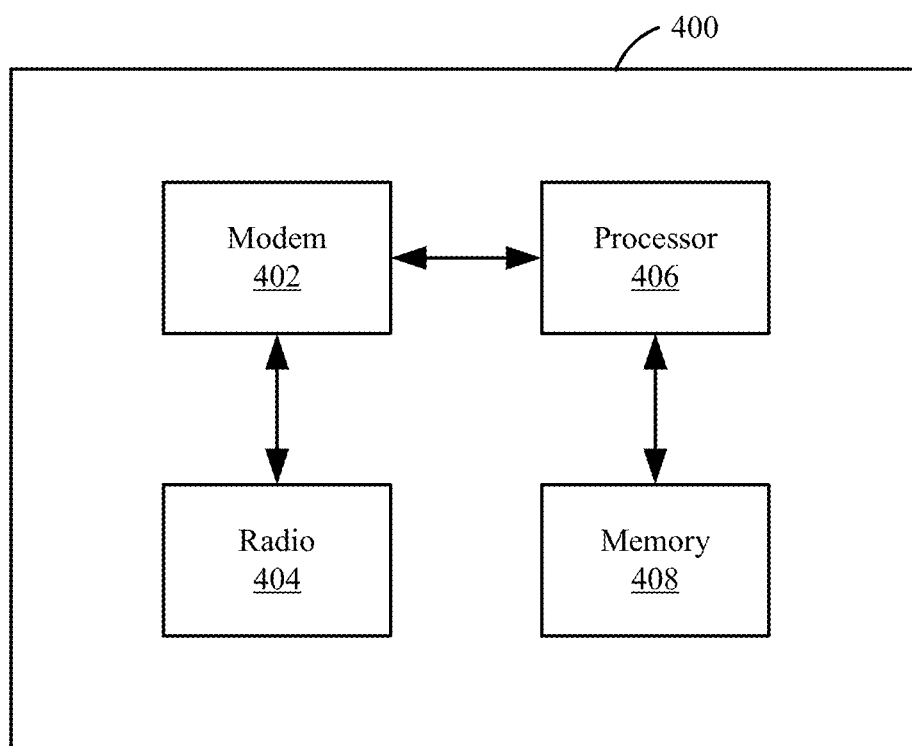
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11bc.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
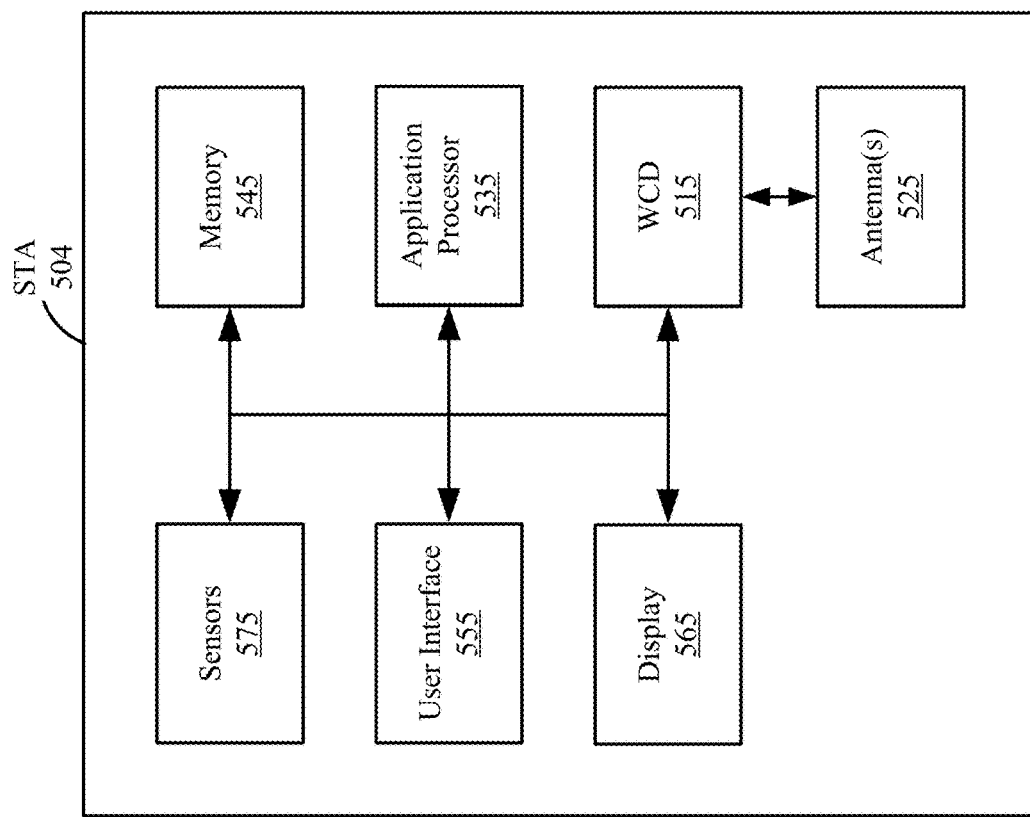
FIG. 5B shows a block diagram of an example STA.
Figure 5A:
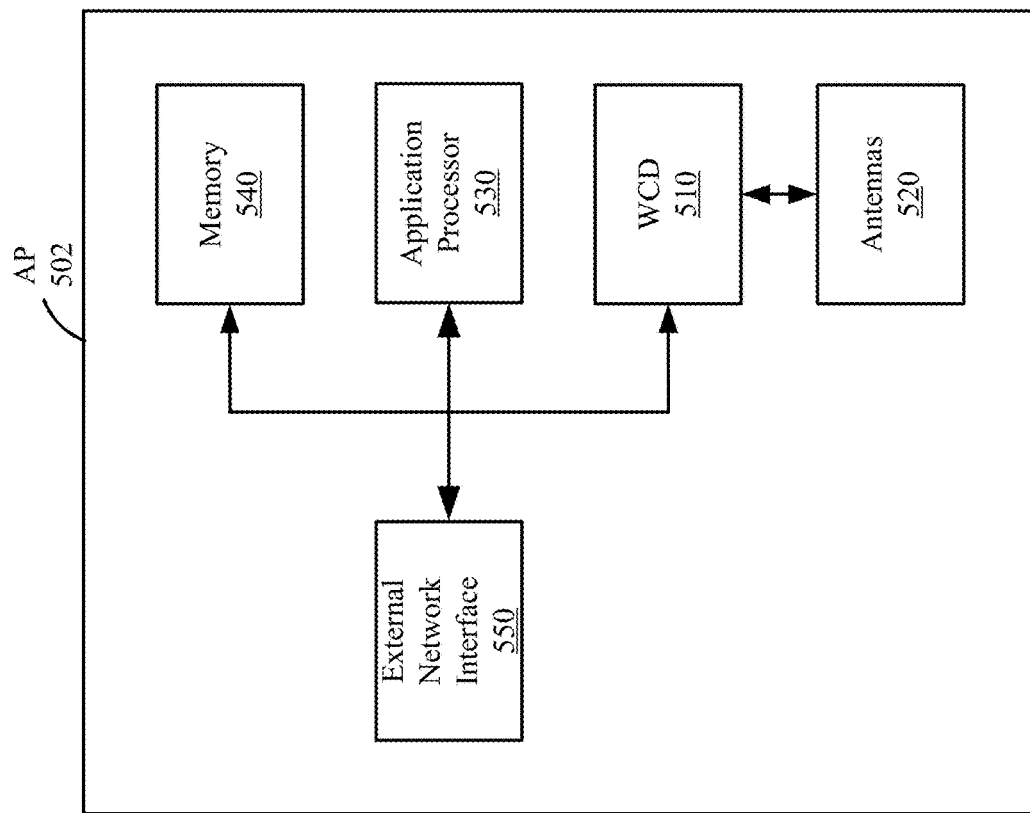
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, the term "distributed transmission" refers to PPDU transmissions on noncontiguous tones (or subcarriers) of a wireless channel (such as in accordance with a "distributed tone plan"). In contrast, the term "contiguous transmission" refers to PPDU transmissions on contiguous tones that represent RUs, as defined by existing versions of the IEEE 802.11 standard (also referred to as a "non-distributed tone plan"). Distributed transmissions provide greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, distributed transmissions may increase the overall transmit power of the PPDU without exceeding the PSD limits of the wireless channel. For example, a distributed tone plan may reduce the total number of tones modulated by the device on any 1-MHz subchannel of the wireless channel. As a result, the wireless communication device may increase its per-tone transmit power without exceeding the PSD limits.

Various aspects relate generally to distributed transmissions, and more particularly, to LTF designs that support distributed transmissions. In some aspects, a transmitting device may obtain a sequence of values representing an LTF of a PPDU and may map the sequence of values to a number (N) of noncontiguous subcarrier indices of a plurality of subcarrier indices spanning a wireless channel according to a distributed tone plan. In such implementations, the transmitting device may modulate the sequence of values on N tones, representing a logical RU, and map the N tones to the N noncontiguous subcarrier indices, respectively. In such implementations, the sequence of values may be an existing LTF sequence associated with a non-distributed tone plan (such as a legacy tone plan or a non-legacy tone plan). In some other implementations, the sequence of values may be obtained based on relative locations of the N noncontiguous subcarrier indices in the wireless channel. In other words, the sequence of values may be a subset of an LTF sequence that maps to the plurality of subcarrier indices spanning the wireless channel. In some implementations, the LTF sequence may be an existing LTF sequence associated with a non-distributed tone plan. In some other implementations, the LTF sequence may be a new LTF sequence configured for distributed transmissions in accordance with the distributed tone plan. For example, the LTF sequence may be configured to reduce a PAPR associated with the distributed transmissions.

Particular implementations of the subject matter described in this disclosure can be implemented to realize one or more of the following potential advantages. As described above, transmitting the data portion of a PPDU on noncontiguous tones of a wireless channel allows the transmitting device to increase the overall transmit power of the data without exceeding the PSD limits of the wireless channel. Transmitting the LTF of a PPDU on noncontiguous tones of a wireless channel (such as the same noncontiguous tones on which the data portion of the PPDU is transmitted) allows a receiving device to more accurately estimate the wireless channel associated with the data portion. By reusing existing LTF sequences associated with a non-distributed tone plan, aspects of the present disclosure may support distributed transmissions of LTFs with only minor changes to the IEEE 802.11 standard. However, aspects of the present disclosure recognize that existing LTF sequences are optimized for contiguous transmissions and may therefore result in higher PAPR when used in distributed transmissions. High PAPR may distort the time-domain signal that carries the LTF values and may thus lead to inaccurate (or less accurate) channel estimations at the receiving device. By designing new LTF sequences tailored to the noncontiguous tone mappings associated with a distributed tone plan, aspects of the present disclosure may reduce or optimize the PAPR associated with distributed transmissions of LTFs in accordance with the distributed tone plan.

Figure 6:
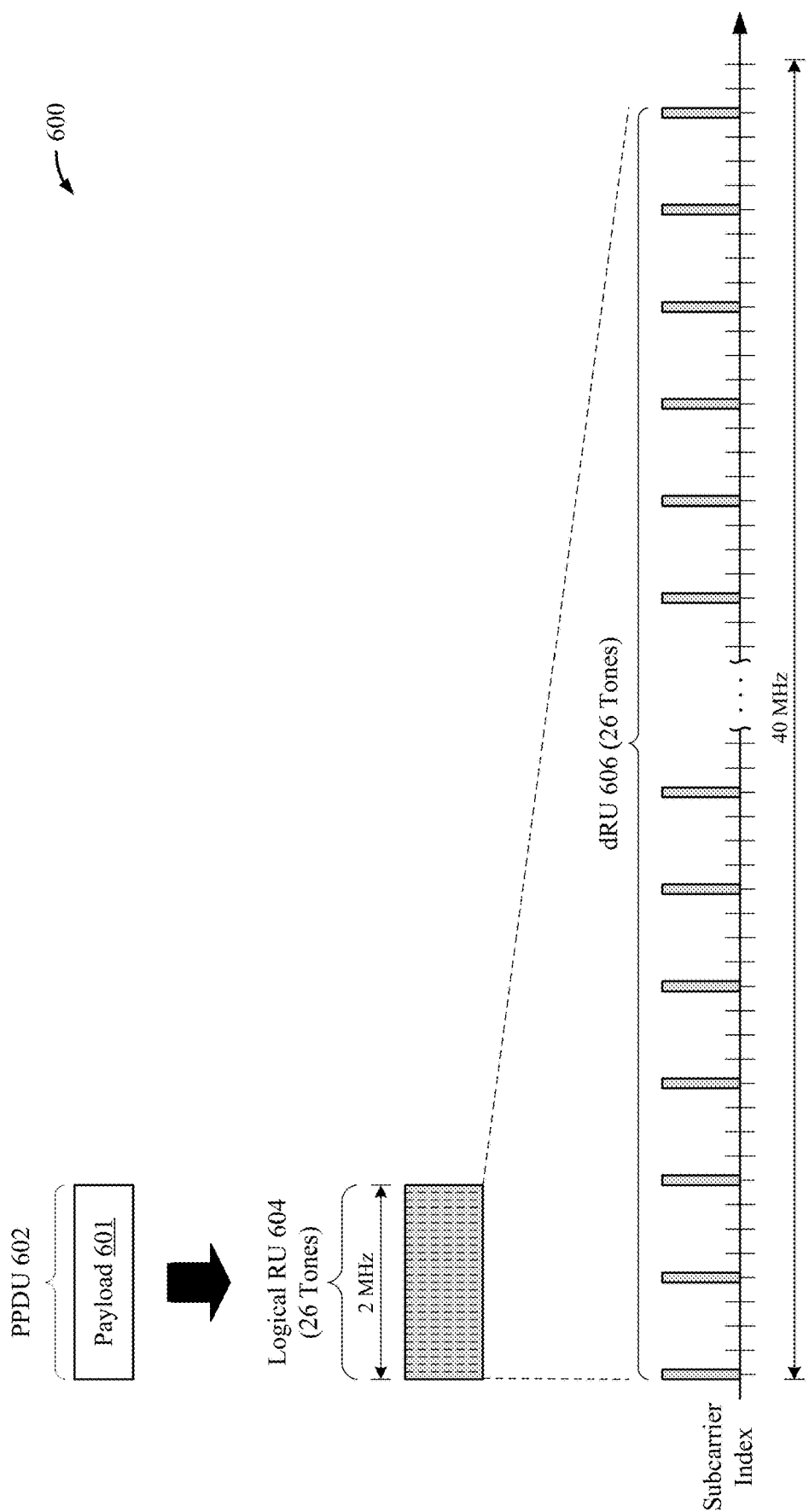
FIG. 6 shows a frequency diagram depicting an example distributed tone mapping according to some implementations.

FIG. 6 shows a frequency diagram 600 depicting an example distributed tone mapping according to some implementations. More specifically, FIG. 6 shows an example mapping of a payload 601 of a PPDU 602 to a set of tones or subcarriers for transmission over a wireless channel. In some implementations, the payload 601 may be modulated on a regular RU (rRU) corresponding to a logical RU 604 associated with a non-distributed tone plan (such as a legacy tone plan or a non-legacy tone plan) and further mapped to a distributed RU (dRU) 606 in accordance with a distributed tone plan. The logical RU 604 represents a number of tones or subcarriers that are allocated for the transmission of the PPDU 602. In contrast, the dRU 606 represents the physical resources (identified by subcarrier indices) that are modulated to transmit the PPDU 602. As used herein, the term "distributed RU" (or dRU) refers to any logical RU that is distributed across a set of noncontiguous subcarrier indices, and the term "distributed tone plan" refers to the set of noncontiguous subcarrier indices associated with a dRU.

Existing versions of the IEEE 802.11 standard define a number of RUs and multiple RUs (MRUs) of various sizes that map to contiguous tones or subcarriers spanning a frequency bandwidth (or wireless channel). For example, a 242-tone RU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As used herein, the term "regular RU" (or rRU) refers to any RU or MRU configuration that is supported by existing versions of the IEEE 802.11 standard (up to, and including, the IEEE 802.11be amendment of the IEEE 802.11 standard), and the term "non-distributed tone plan" refers to any tone plan defined by existing versions of the IEEE 802.11 standard. Further, the term "legacy" is used herein to refer to PPDU formats and communication protocols conforming to the IEEE 802.11ax amendment, or earlier versions, of the IEEE 802.11 standard. For example, a "legacy tone plan" may be any non-distributed tone plan supported by the IEEE 802.11ax amendment. In contrast, the term "non-legacy" is used herein to refer to PPDU formats and communication protocols conforming to the IEEE 802.11be amendment, and future generations, of the IEEE 802.11 standard. For example, a "non-legacy tone plan" may be any non-distributed tone plan supported by the IEEE 802.11be amendment.

In some implementations, the logical RU 604 may represent an rRU as defined by existing versions of the IEEE 802.11 standard. In other words, the logical RU 604 maps directly to a respective rRU according to a non-distributed tone plan. In the example of FIG. 6, the logical RU 604 includes 26 tones. Thus, in accordance with a non-distributed tone plan, the logical RU 604 would map directly to 26 contiguous or consecutive subcarrier indices spanning a 2 MHz subchannel. However, when mapped to an rRU, the transmit power of the logical RU 604 may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 604 is limited by the number of tones mapped to each 1 MHZ subchannel of the wireless channel. Accordingly, each 1 MHz subchannel of a PSD-limited channel may be referred to herein as a "PSD-limited subchannel."

Aspects of the present disclosure recognize that the per-tone transmit power of the logical RU 604 can be increased by distributing the tones across a wider bandwidth. Increasing the per-tone transmit power can also increase the overall transmit power of the logical RU 604. Thus, in some implementations, the logical RU 604 may be mapped to a set of noncontiguous subcarrier indices spanning a wider-bandwidth channel. With reference for example to FIG. 6, the logical RU 604 is mapped to the dRU 606 according to a distributed tone plan. More specifically, the logical RU 604 is mapped to 26 noncontiguous subcarrier indices spread across a 40 MHz wireless channel (also referred to herein as the "spreading bandwidth"). Compared to the tone mapping described above with respect to the non-distributed tone plan, the distributed tone mapping depicted in FIG. 6 effectively reduces the number of tones (of the logical RU 604) in each 1 MHz subchannel. For example, each of the 26 tones can be mapped to a different 1 MHz subchannel of the 40 MHz channel. As a result, each AP or STA implementing the distributed tone mapping of FIG. 6 can maximize its per-tone transmit power (which may maximize the overall transmit power of the logical RU 604).

In some implementations, a transmitting device (such as a STA or an AP) may include a distributed tone mapper that maps the logical RU 604 to the dRU 606 in the frequency domain (such as described with reference to FIG. 6). The dRU 606 is then converted to a time-domain signal (such as by an inverse fast Fourier transform (IFFT)) for transmission over a wireless channel. A receiving device (such as an AP or a STA) receives the time-domain signal over the wireless channel and converts the time-domain signal back to the dRU 606 (such as by a fast Fourier transform (FFT)). In some implementations, the receiving device may include a distributed tone demapper that demaps the dRU 606 to the logical RU 604. In other words, the distributed tone demapper reverses the mapping performed by the distributed tone mapper at the transmitting device. The receiving device can then recover the information carried (or modulated) on the logical RU 604 as a result of the demapping.

In the example of FIG. 6, the logical RU 604 is distributed evenly across a 40 MHz wireless channel. However, in actual implementations, the logical RU 604 can be mapped to any suitable pattern of noncontiguous subcarrier indices. For example, in some aspects, the distance between any pair of modulated tones may be different (such as less or greater) than the distances depicted in FIG. 6. Still further, in some aspects, multiple logical RUs may be mapped to interleaved subcarrier indices of a shared wireless channel.

Figure 7:
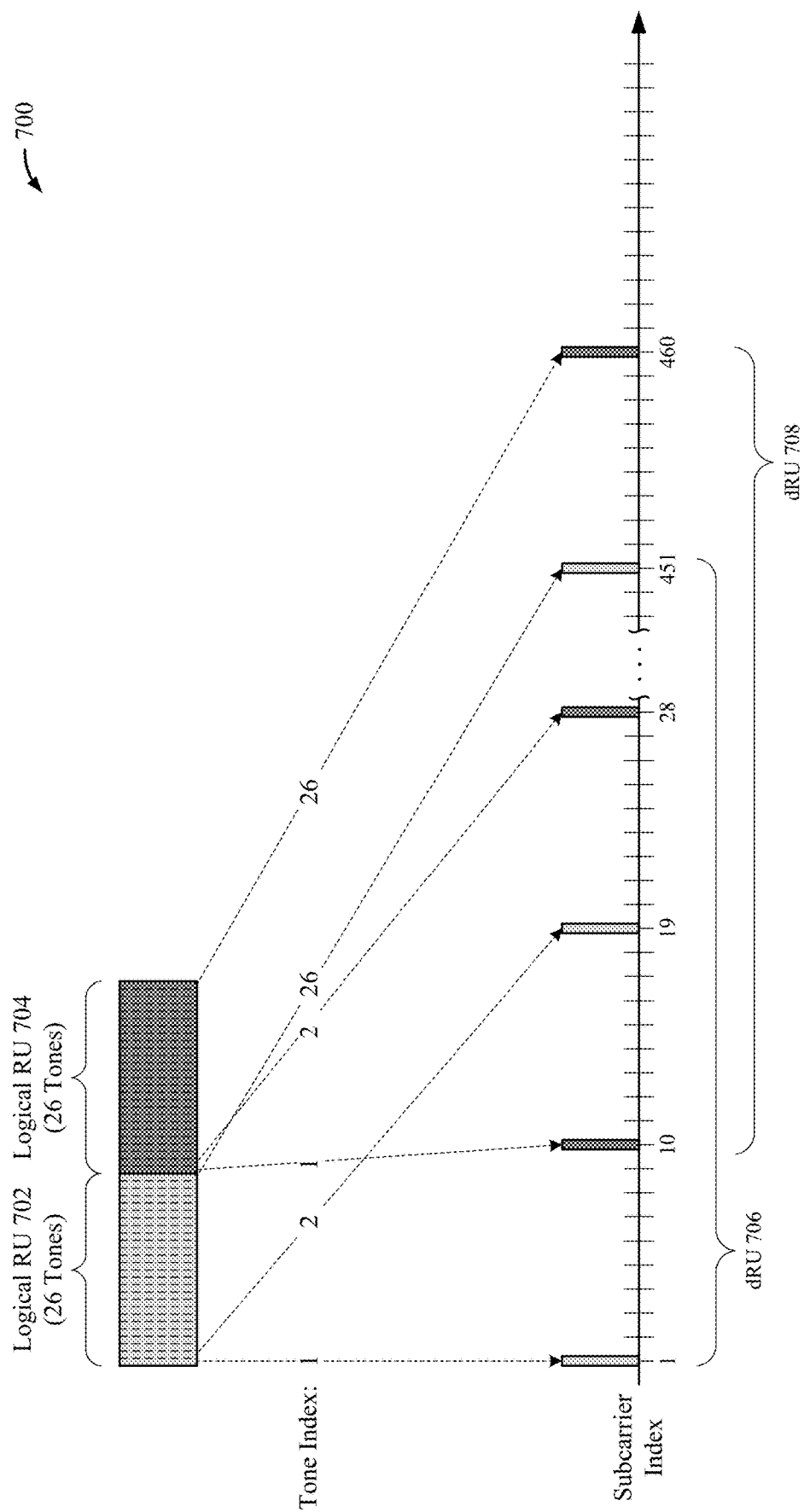
FIG. 7 shows a frequency diagram depicting an example mapping of logical resource unit (RUs) to distributed RU (dRUs), respectively, according to some implementations.

FIG. 7 shows a frequency diagram depicting an example mapping of logical RUs 702 and 704 to dRUs 706 and 708, respectively, according to some implementations. In some implementations, each of the logical RUs 702 and 704 may carry user data for a respective AP or STA (not shown for simplicity).

In the example of FIG. 7, each of the logical RUs 702 and 704 includes 26 tones and the spreading bandwidth is equal to 40 MHz. In some implementations, the logical RUs 702 and 704 are mapped to the dRUs 706 and 708, respectively, according to a distributed tone plan. More specifically, the 26 tones associated with each of the logical RUs 702 and 704 is mapped to a respective set of 26 noncontiguous subcarrier indices spread across a 40 MHz wireless channel. In some implementations, the distributed tone plan maps the 26 tones of the first logical RU 702 to every $18^{th}$ subcarrier index starting at subcarrier index 1 and maps the 26 tones of the second logical RU 704 to every $18^{th}$ subcarrier index starting at subcarrier index 10. As a result, the first dRU 706 includes every $18^{th}$ tone modulated on subcarrier indices 1 through 451, and the second dRU 708 includes every $18^{th}$ tone modulated on subcarrier indices 10 through 460.

As shown in FIG. 7, the first tone of the logical RU 702 (tone_idx=1) is mapped to subcarrier index 1, the second tone of the logical RU 702 (tone_idx=2) is mapped to subcarrier index 19, and the mapping pattern continues until the $26^{th}$ tone of the logical RU 702 (tone_idx=26) is mapped to subcarrier index 451. Similarly, the first tone of the logical RU 704 (tone_idx=1) is mapped to subcarrier index 10, the second tone of the logical RU 704 (tone_idx=2) is mapped to subcarrier index 28, and the mapping pattern continues until the $26^{th}$ tone of the logical RU 704 (tone_idx=26) is mapped to subcarrier index 460. Thus, as shown in FIG. 7, the distributed tone plan interleaves the logical RUs 702 and 704, offset by 9 subcarrier indices, across the dRU spreading bandwidth. Aspects of the present disclosure recognize that, by interleaving the dRUs 706 and 708, the per-tone transmit power of each dRU can be significantly increased without sacrificing spectral efficiency.

Figure 8:
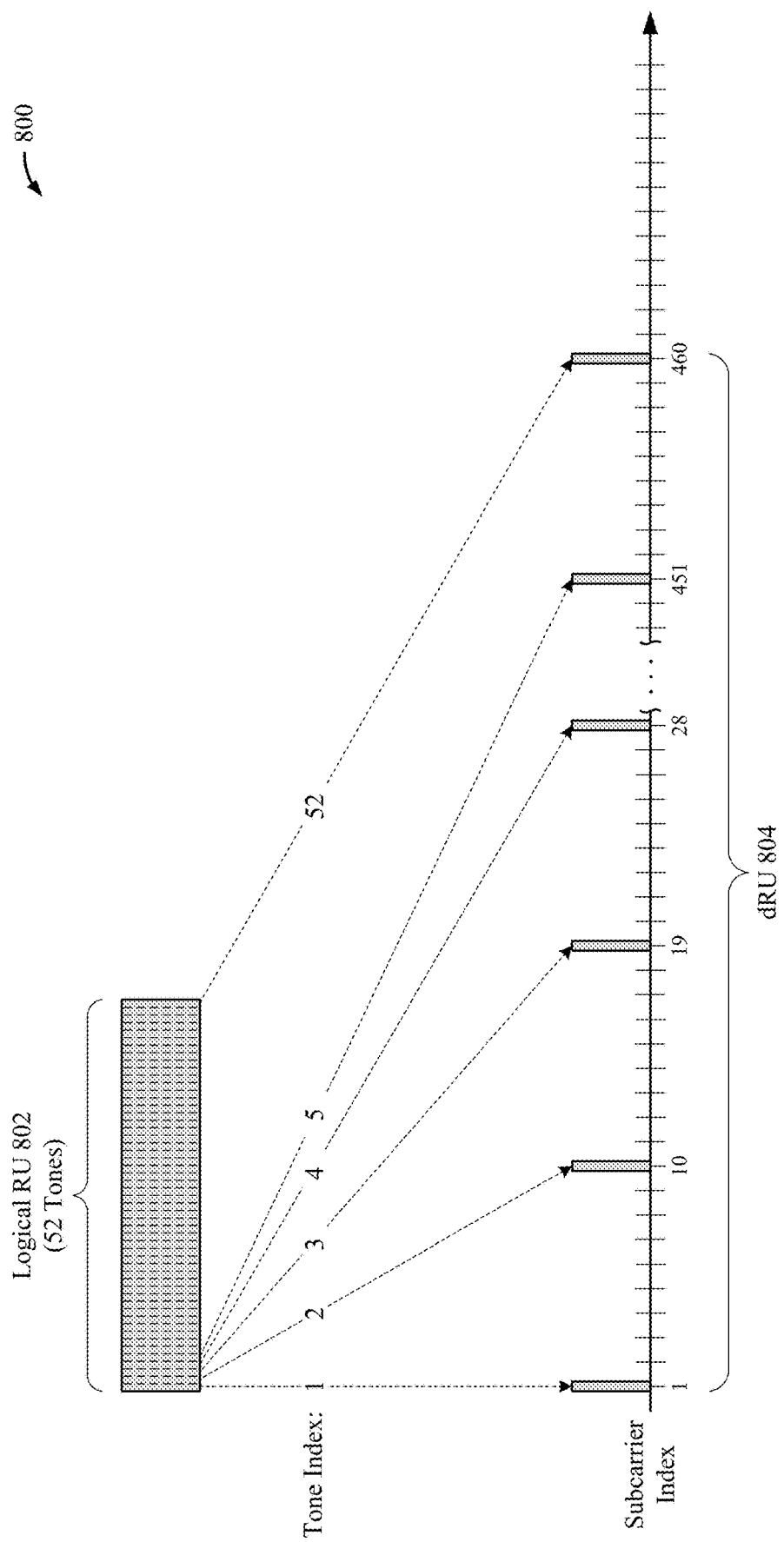
FIG. 8 shows a frequency diagram depicting an example mapping of a logical RU to a dRU according to some implementations.

FIG. 8 shows a frequency diagram depicting an example mapping of a logical RU 802 to a dRU 804 according to some implementations. In some implementations, the logical RU 802 may carry user data for a respective AP or STA (not shown for simplicity).

In the example of FIG. 8, the logical RU 802 includes 52 tones and the dRU spreading bandwidth is equal to 40 MHz. In some implementations, the logical RU 802 is mapped to the dRU 804 according to a distributed tone plan. More specifically, the 52 tones associated with the logical RU 802 are mapped to 52 noncontiguous subcarrier indices spread across a 40 MHz channel. In some implementations, the distributed tone plan maps the 52 tones of the logical RU 802 to every $9^{th}$ subcarrier index starting at subcarrier index 1. As a result, the dRU 804 includes every $9^{th}$ tone modulated on subcarrier indices 1 through 460.

As shown in FIG. 8, the first tone of the logical RU 802 (tone_idx=1) is mapped to subcarrier index 1, the second tone of the logical RU 802 (tone_idx=2) is mapped to subcarrier index 10, the third tone of the logical RU 802 (tone_idx=3) is mapped to subcarrier index 19, the fourth tone of the logical RU 802 (tone_idx=4) is mapped to subcarrier index 28, and the mapping pattern continues until the $52^{nd}$ tone of the logical RU 802 (tone_idx=52) is mapped to subcarrier index 460. With reference for example to FIG. 7, the dRU 804 occupies the same physical subcarrier indices as the dRUs 706 and 708.

Aspects of the present disclosure recognize that new packet designs are needed to support distributed transmissions. For example, existing versions of the IEEE 802.11 standard define a PPDU format that includes a PHY preamble followed by a payload. As described with reference to FIGS. 6-8, the payload may be transmitted on a dRU to achieve increased transmit power. The PHY preamble includes one or more LTFs which may be used for channel estimation. For example, a transmitting device may transmit a known pattern of symbols, in an LTF, to a receiving device. The receiving device may use its knowledge of the symbol pattern in the received LTF (also referred to as an "LTF sequence") to estimate how wireless communications propagate through a wireless channel between the transmitting device and the receiving device. The receiving device may further use such channel estimations to recover the data in the data field (or payload) of the PPDU more accurately. Because the LTF is used to estimate the wireless channel associated with the data portion of a PPDU, changing the tone plan used for data transmissions (such as from a non-distributed tone plan to a distributed tone plan) may require changes in LTF design. In other words, new LTF sequences or mappings may be needed to support distributed transmission of PPDUs.

Figure 9:
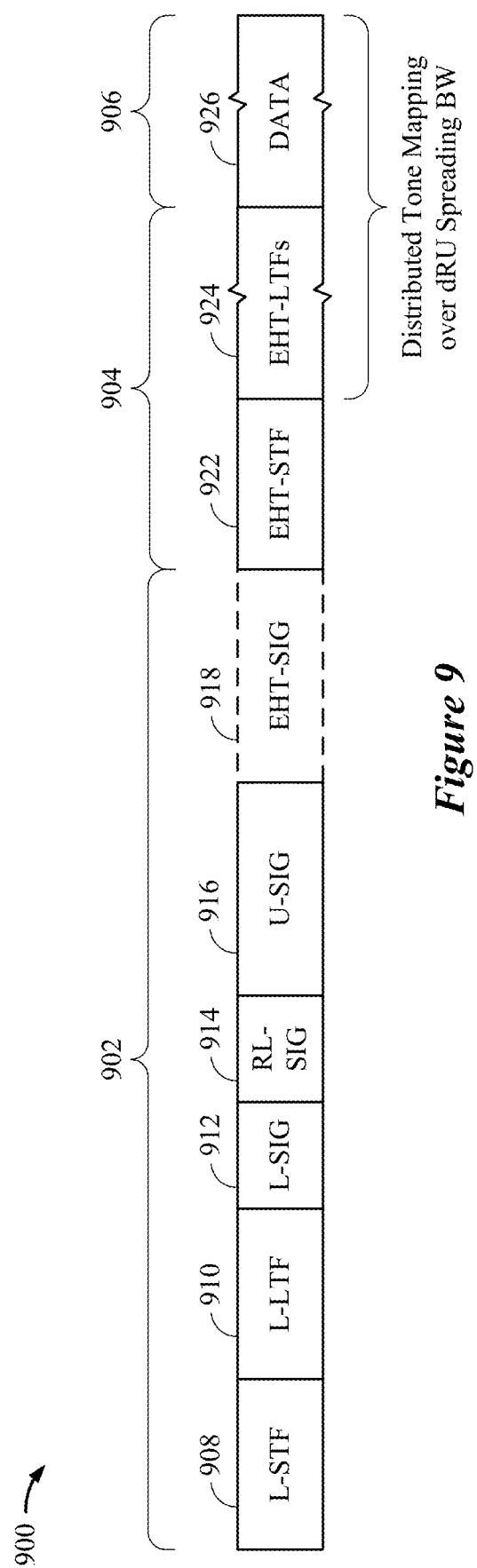
FIG. 9 shows an example PPDU usable for communications between an AP and one or more STAs according to some implementations.

FIG. 9 shows an example PPDU 900 usable for communications between an AP and one or more STAs according to some implementations. In some implementations, the PPDU 900 may be one example of the PPDU 602 of FIG. 6. The PPDU 900 includes a PHY preamble including a first portion 902 and a second portion 904. The PPDU 900 may further include a PHY payload 906 after the preamble, for example, in the form of a PSDU carrying a DATA field 926. In some implementations, the PPDU 900 may be formatted as a non-legacy or Extremely High Throughput (EHT) PPDU.

The first portion 902 of the PHY preamble includes L-STF 908, L-LTF 910, L-SIG 912, a repeated legacy signal field (RL-SIG) 914, and a universal signal field (U-SIG) 916. In some implementations, the first portion 904 of the PHY preamble may further include a non-legacy signal field (EHT-SIG) 918. With reference to the IEEE 802.11be amendment of the IEEE 802.11 standard, the first portion 902 may be referred to as a "pre-EHT modulated portion" of the PPDU 900. The second portion 904 of the PHY preamble includes a non-legacy short training field (EHT-STF) 922 and a number of non-legacy long training fields (EHT-LTFs) 924. With reference to the IEEE 802.11be amendment of the IEEE 802.11 standard, the second portion 904, together with the PHY payload 906, may be referred to as the "EHT modulated portion" of the PPDU 900.

With reference for example to FIG. 6, the PHY payload 906 may be one example of the payload 601. The PHY payload 906 may be modulated on a logical RU that is further mapped to a dRU, for example, to achieve gains in transmit power. As described with reference to FIGS. 6-8, the tones of the dRU are distributed across noncontiguous subcarrier indices associated with a wireless channel. The bandwidth of the wireless channel is referred to as the spreading bandwidth or "distribution bandwidth." To achieve a noncontiguous tone distribution, the bandwidth of the logical RU on which the PHY payload 906 is modulated must be smaller than the spreading bandwidth. For example, as shown in FIG. 6, the payload 601 is modulated on a 26-tone logical RU 604 having a bandwidth of approximately 2 MHZ, and the tones of the logical RU 604 are further distributed across 26 noncontiguous subcarrier indices associated with the 40 MHz spreading bandwidth.

The EHT-LTFs 924 carry a sequence of values that are used for channel estimation at the receiving device. As such, the EHT-LTFs 924 may be transmitted on the same subcarrier indices as the PHY payload 906. Thus, in some implementations, the EHT-LTFs 924 also may be mapped to a dRU similar to that on which the PHY payload 906 is transmitted (such as described with reference to FIGS. 6-8). In some aspects, a transmitting device may obtain or otherwise determine the sequence of values to be included in the EHT-LTFs 924 based on an LTF sequence associated with the spreading bandwidth. For example, the LTF sequence associated with a particular bandwidth may define a sequence of values that can be modulated on each tone (or subcarrier index) spanning the bandwidth. However, because a dRU is only transmitted on noncontiguous tones within the spreading bandwidth, the transmitting device may select a subset of LTF values (from the LTF sequence) for transmission in the EHT-LTFs 924. In some implementations, the selection of LTF values may depend on the size and location of the logical RU relative to the spreading bandwidth. In some other implementations, the selection of the LTF values may depend on the relative locations of the dRU tones (such as the noncontiguous tones) in the spreading bandwidth.

Figure 10:
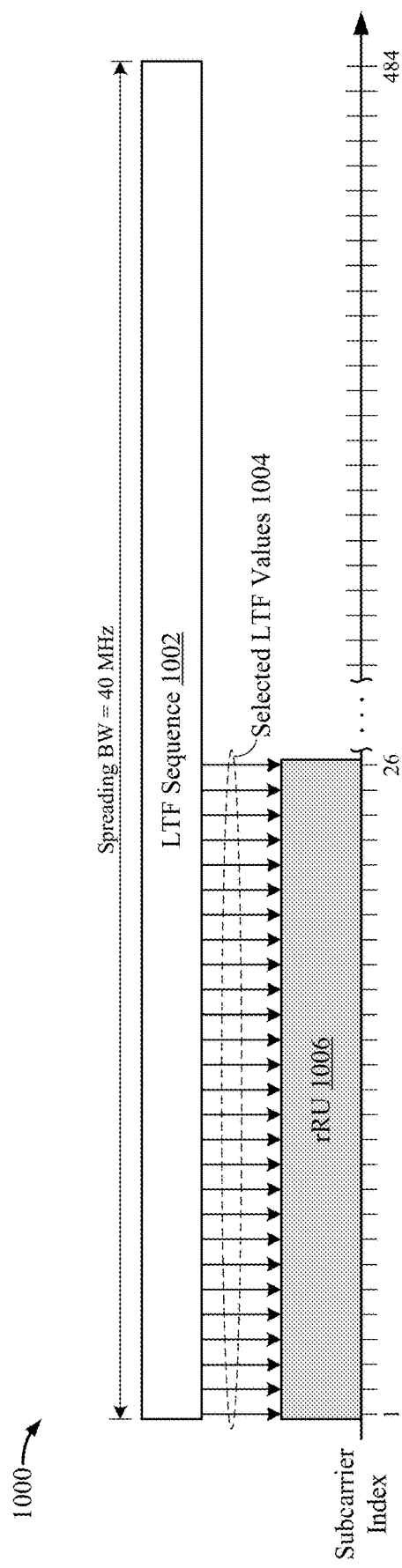
FIG. 10 shows a frequency diagram depicting an example operation for selecting a sequence of LTF values to be mapped to a dRU according to some implementations.

FIG. 10 shows a frequency diagram 1000 depicting an example operation for selecting a sequence of LTF values 1004 to be mapped to a dRU (not shown for simplicity) according to some implementations. In some implementations, the dRU may be one example of the dRU 706 of FIG. 7. Thus, the dRU may be associated with a spreading bandwidth equal to 40 MHz. In some implementations, the sequence of LTF values 1004 may be selected from an LTF sequence 1002 associated with the spreading bandwidth of the dRU. For example, the LTF sequence 1002 may be defined for 484 tones spanning a 40 MHZ bandwidth.

As described with reference to FIG. 9, the EHT-LTFs 924 are transmitted on the same subcarrier indices as the PHY payload 906. In some aspects, the EHT-LTFs 924 may be modulated on a number of tones associated with a logical RU which is further mapped to noncontiguous subcarrier indices associated with the dRU (such as described with reference to FIGS. 6-8). In some implementations, the subset of LTF values 1004 may be selected based on the size and location of the logical RU relative to the dRU spreading bandwidth. In the example of FIG. 10, the logical RU represents the first 26 tones of the 40 MHZ bandwidth. In other words, according to a non-distributed tone plan, the logical RU would be mapped to 26 contiguous subcarrier indices (1-26) spanning a first rRU 1006 in the 40 MHZ bandwidth. The values of the LTF sequence 1002 that map to the rRU 1006 may be selected as the LTF values 1004 to be included in the EHT-LTFs 924. As such, the LTF values 1004 may include the first 26 LTF values of the LTF sequence 1002. In some implementations, the LTF sequence 1002 may be an existing LTF sequence associated with a non-distributed tone plan (such as defined by existing versions of the IEEE 802.11 standard).

Figure 11:
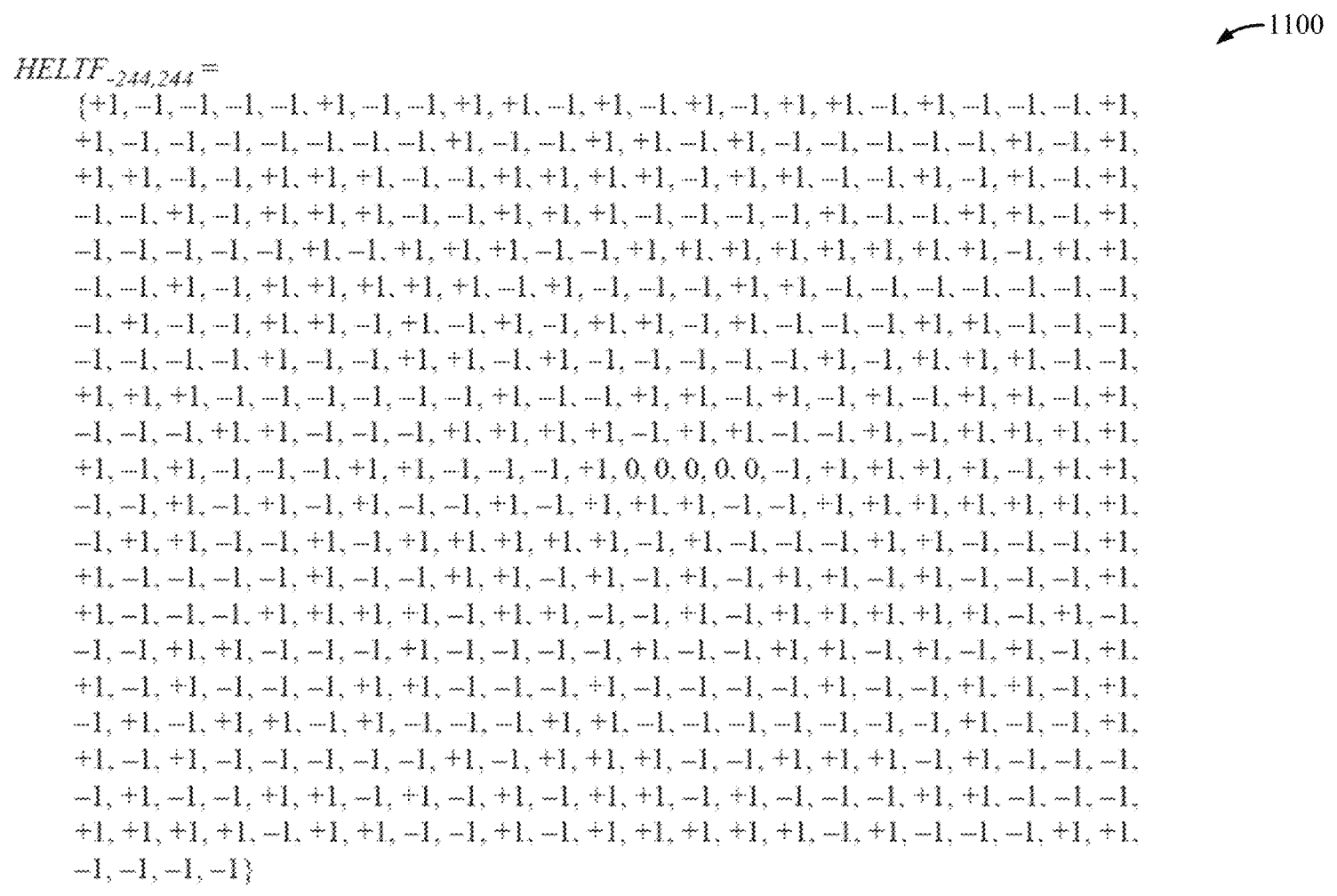

FIG. 11 shows an example LTF sequence 1100 associated with a non-distributed tone plan. In other words, the LTF sequence 1100 may be an existing LTF sequence defined by existing versions of the IEEE 802.11 standard. In the example of FIG. 11, the LTF sequence 1100 is defined for a 4x legacy or High Efficiency (HE) LTF associated with a 40 MHz bandwidth. Thus, the LTF sequence 1100 includes 484 LTF values that map to 484 tones, respectively, spanning the 40 MHz bandwidth. As shown in FIG. 11, the LTF sequence 1100 is modulated in accordance with a binary phase-shift keying (BPSK) modulation scheme, where each modulated tone carries an LTF value equal to +1 or −1 (which represent phases or points on a BPSK constellation) and zeroes represent null tones.

In some implementations, the LTF sequence 1100 may be one example of the LTF sequence 1002 of FIG. 10. With reference for example to FIG. 10, the selected LTF values 1004 may include only the first 26 LTF values of the LTF sequence 1100 (+1, −1, −1, −1, −1, +1, −1, −1, +1, +1, −1, +1, −1, +1, −1, +1, +1, −1, +1, −1, −1, −1, +1, +1, −1, −1). In other words, only the first 26 LTF values of the LTF sequence 1100 may be transmitted as an LTF of a PPDU according to the mapping described with reference to FIG. 10. However, because the LTF is transmitted on a dRU, the 26 LTF values are mapped to noncontiguous subcarrier indices within the 40 MHz spreading bandwidth (such as described with reference to FIG. 7). For example, the 1$^{st}$ LTF value (+1) may be mapped to subcarrier index 1, the 2$^{nd}$ LTF value (−1) may be mapped to subcarrier index 19, with each successive LTF value being mapped to every 18$^{th}$ subcarrier index until the 26$^{th}$ LTF value (−1) is mapped to subcarrier index 451.

In some implementations, the LTF sequence 1100 may conform to a legacy tone plan defined by the IEEE 802.11ax amendment, or earlier versions, of the IEEE 802.11 standard. In some other implementations, the LTF sequence 1100 may conform to a non-legacy tone plan defined by the IEEE 802.11be amendment, and future generations, of the IEEE 802.11 standard. Aspects of the present disclosure recognize that, for 20 MHz and 40 MHz bandwidths, the mapping of an LTF sequence to an rRU is the same according to the legacy tone plan and the non-legacy tone plan. However, for 80 MHZ (or larger) bandwidths, the mapping of an LTF sequence to an rRU may be different depending on whether the mapping conforms to the legacy tone plan or the non-legacy tone plan. As a result, different LTF values 1004 may be selected from the LTF sequence 1100 depending on whether the LTF sequence 1100 conforms to the legacy tone plan or the non-legacy tone plan.

Figure 12A:
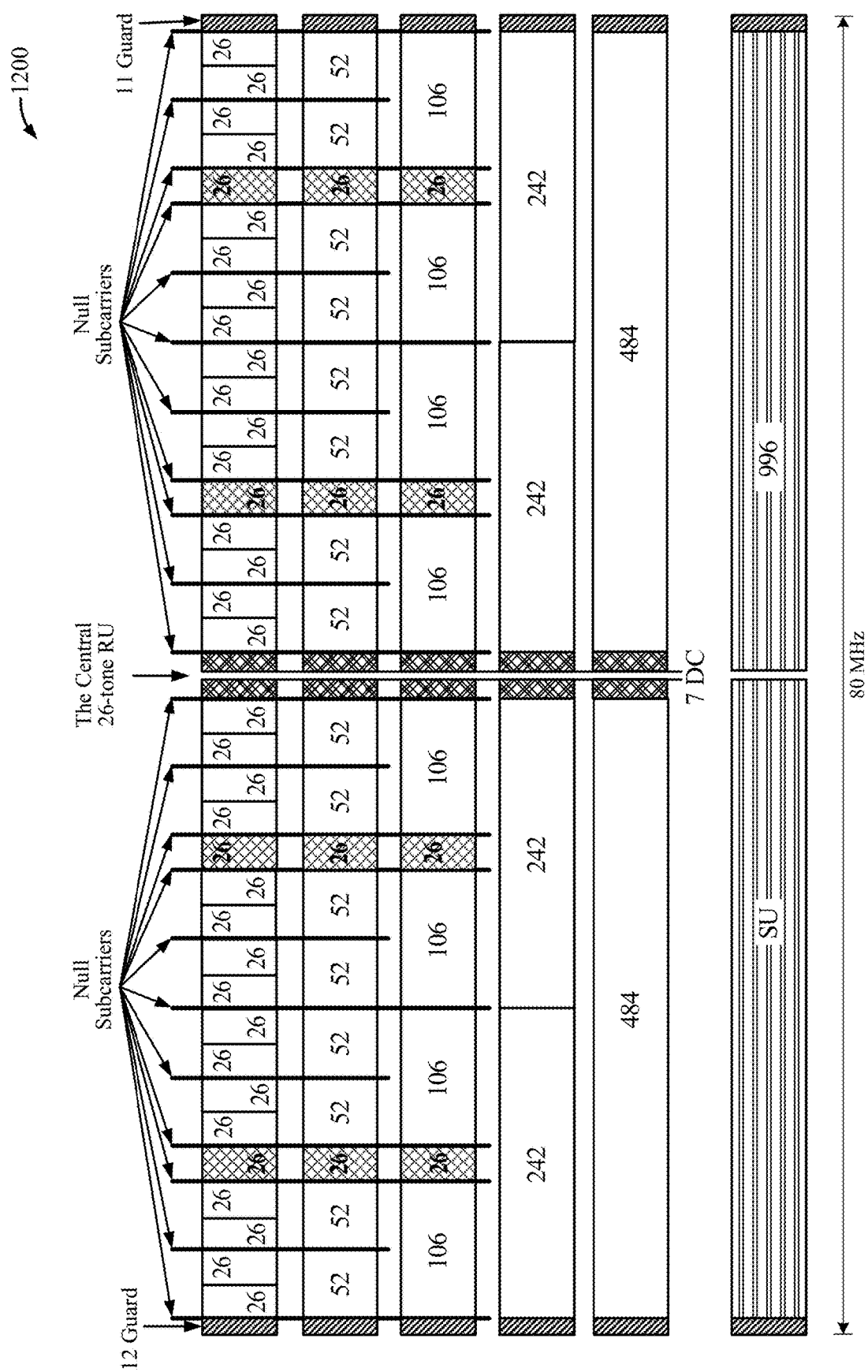
FIGS. 12A and 12B show frequency diagrams depicting legacy and non-legacy tone plans, respectively, associated with an 80 MHz bandwidth.
Figure 12B:
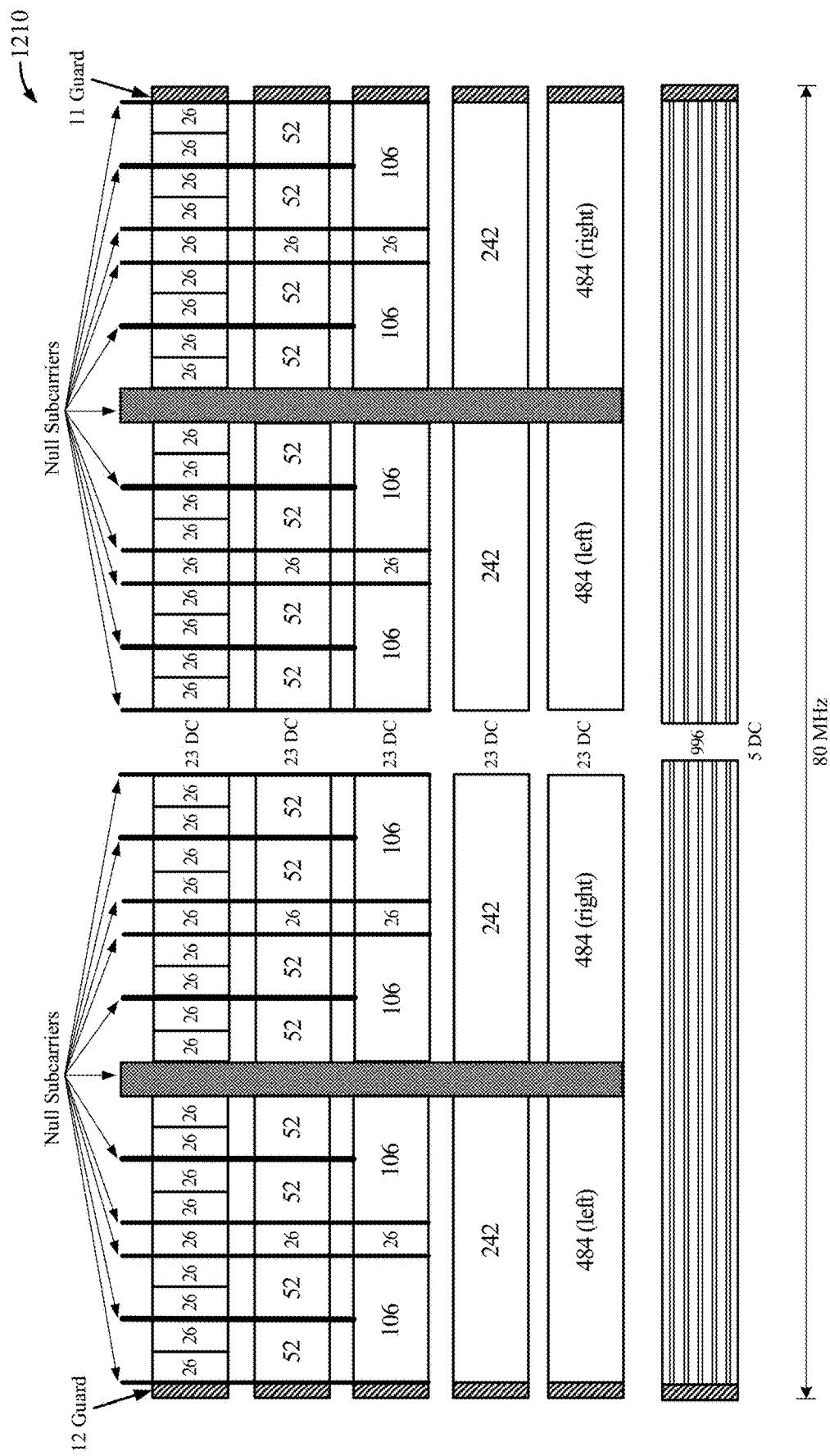

FIGS. 12A and 12B show frequency diagrams 1200 and 1210 depicting legacy and non-legacy tone plans, respectively, associated with an 80 MHz bandwidth. Existing versions of the IEEE 802.11 standard define an LTF sequence (not shown for simplicity) including 996 LTF values that map to 996 tones, respectively, spanning the 80 MHZ bandwidth. However, the locations of RUs in the legacy tone plan are different than the locations of RUs in the non-legacy tone plan. With reference for example to FIG. 12A, the 242-tone RUs located in each 40 MHz sub-band of the legacy tone plan are adjacent or contiguous with one another, and each 484-tone RU maps to 484 contiguous tones. In contrast, as shown FIG. 12B, each 40 MHz sub-band is further subdivided into lower and upper 20 MHz portions that are separated by 5 null subcarriers. As a result, the 242-tone RUs located in each 40 MHz sub-band of the non-legacy tone plan are noncontiguous with one another, and each 484-tone RU maps to 242 contiguous tones in the lower 20 MHZ portion and 242 contiguous tones in the upper 20 MHz portion of each 40 MHz sub-band. Thus, the 996 LTF values may map to a different set of tones depending on whether the LTF sequence conforms to the legacy tone plan or the non-legacy tone plan.

Aspects of the present disclosure further recognize that the existing LTF sequences defined by existing versions of the IEEE 802.11 standard are designed for transmission on contiguous tones (or rRUs). As such, transmitting the same sequence of LTF values on noncontiguous tones may alter the PAPR associated with the LTF sequence. Moreover, the LTF value modulated on a given subcarrier index may vary depending on the size and location of the logical RU from which it is mapped, resulting in further variations in PAPR.

With reference for example to FIGS. 7 and 8, subcarrier index 10 may be modulated with the first LTF value of the 26-tone logical RU 704 or the second LTF value of the 52-tone logical RU 802. Because the existing LTF sequences are designed for optimal PAPR when transmitted on contiguous tones, any changes to the mapping of the LTF sequence may result in higher PAPR. High PAPR may significantly increase power consumption while reducing the efficiency of the power amplifier. High PAPR also may distort the time-domain signal that carries the LTF values and may thus lead to inaccurate (or less accurate) channel estimations at the receiving device.

Figure 13:
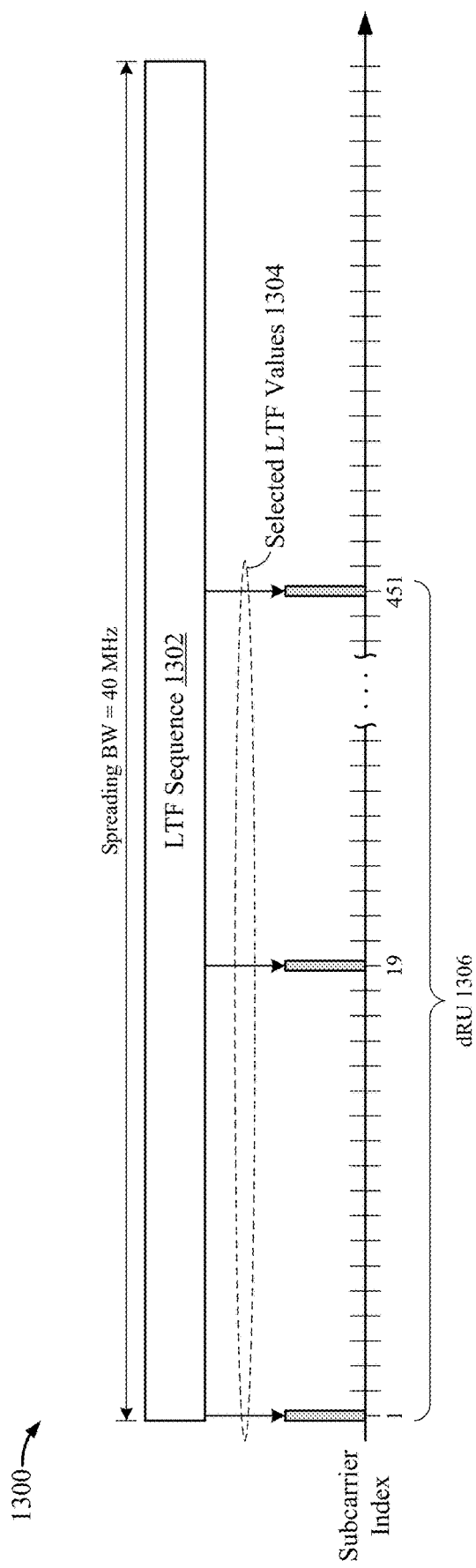
FIG. 13 shows another frequency diagram depicting an example operation for selecting a sequence of LTF values to be mapped to a dRU according to some implementations.

FIG. 13 shows another frequency diagram 1300 depicting another example operation for selecting a sequence of LTF values 1304 to be mapped to a dRU 1306 according to some implementations. In some implementations, the dRU 1306 may be one example of the dRU 706 of FIG. 7. Thus, the dRU 1306 may be associated with a spreading bandwidth equal to 40 MHz. In some implementations, the sequence of LTF values 1304 may be selected from an LTF sequence 1302 associated with the spreading bandwidth of the dRU 1306. For example, the LTF sequence 1302 may be defined for 484 tones spanning a 40 MHz bandwidth.

As described with reference to FIG. 9, the EHT-LTFs 924 are transmitted on the same subcarrier indices as the PHY payload 906. In other words, the EHT-LTFs 924 are modulated on a number of tones that map to noncontiguous subcarrier indices associated with the dRU 1306 (such as described with reference to FIGS. 6-8). In some implementations, the subset of LTF values 1304 may be selected based on the locations of the modulated tones of the dRU 1306. In the example of FIG. 13, the dRU 1306 includes 26 tones that are transmitted on every $18^{th}$ subcarrier index from 1 to 451. The values of the LTF sequence 1302 that map to the modulated tones of the dRU 1306 may be selected as the LTF values 1304 to be included in the EHT-LTFs 924. For example, the LTF values 1304 may include the $1^{st}$ LTF value of the LTF sequence 1302, the $19^{th}$ value of the LTF sequence 1302, and every $18^{th}$ LTF value thereafter until the $451^{st}$ LTF value of the LTF sequence 1302.

In some implementations, the LTF sequence 1302 may be an existing LTF sequence associated with a non-distributed tone plan (such as shown in FIG. 11). With reference for example to FIG. 11, the selected LTF values 1304 may include every $18^{th}$ LTF value of the LTF sequence 1302 beginning with the $1^{st}$ LTF value (+1) and ending with the $451^{st}$ LTF value (−1). In the example of FIG. 13, the selected LTF values 1304 map directly to respective subcarrier indices on the 40 MHz bandwidth. For example, the $1^{st}$ LTF value (+1) may be mapped to subcarrier index 1, the $19^{th}$ LTF value (+1) may be mapped to subcarrier index 19, and the $451^{st}$ LTF value may be mapped to subcarrier index 451. As described above with reference to FIGS. 10-12B, reusing existing LTF sequences for distributed transmissions may result in high PAPR.

In some other implementations, the LTF sequence 1302 may be a new LTF sequence designed for transmission on dRU tones. For the reasons described above, the design of the new LTF sequence should result in low (or minimal) PAPR associated with LTF transmissions on dRUs. For example, the LTF sequence may be designed to mitigate or reduce the worst case PAPR associated with one or more dRUs that can be transmitted over a particular spreading bandwidth. As used herein, the term "worst case PAPR" associated with a given dRU refers to the highest PAPR associated with the transmission of the dRU over any number of spatial streams (such as with any P-matrix and R-matrix combination). In some aspects, the new LTF sequences may be constructed hierarchically, for a particular spreading bandwidth, by determining LTF values that are suitable for transmission in dRUs of various sizes (from smallest to largest). More specifically, LTF values that map to smaller dRUs may be used as base sequences for determining LTF values that map to larger dRUs.

For example, a 106-tone dRU is the largest dRU size that can be accommodated by a 20 MHz spreading bandwidth (as the next-largest dRU size would require at least 242 noncontiguous tones, which are not available in 20 MHZ). However, two 106-tone dRUs can be transmitted, in an interleaved manner, over a 20 MHz spreading bandwidth (such as described with reference to FIG. 7). Thus, the LTF sequence associated with a 20 MHZ spreading bandwidth ($LTF_{20\_MHZ}$) can be hierarchically constructed from two 106-tone base sequences ($LTF_{dRU106,1}$ and $LTF_{dRU106,2}$), four 52-tone base sequences ($LTF_{dRU52,1}$-$LTF_{dRU52,4}$), and nine 26-tone base sequences ($LTF_{dRU26,1}$-$LTF_{dRU26,9}$), as follows:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU52,3} = \gamma_5 * LTF_{dRU26,6} + \gamma_6 * LTF_{dRU26,7}$$

$$LTF_{dRU52,4} = \gamma_7 * LTF_{dRU26,8} + \gamma_8 * LTF_{dRU26,9}$$

$$LTF_{dRU106,1} = \gamma_9 * LTF_{dRU52,1} + \gamma_{10} * LTF_{dRU52,2} + LTF_{add\_tones\_1}$$

$$LTF_{dRU106,2} = \gamma_{11} * LTF_{dRU52,3} + \gamma_{12} * LTF_{dRU52,4} + LTF_{add\_tones\_2}$$

$$LTF_{20\_MHz} = LTF_{dRU106,1} + LTF_{dRU106,2}$$

where $\gamma_1$ and $\gamma_2$ are phase rotations applied to $LTF_{dRU26,1}$ and $LTF_{dRU26,2}$, respectively; $\gamma_3$ and $\gamma_4$ are phase rotations applied to $LTF_{dRU26,3}$ and $LTF_{dRU26,4}$, respectively; $\gamma_5$ and $\gamma_6$ are phase rotations applied to $LTF_{dRU26,6}$ and $LTF_{dRU26,7}$, respectively; $\gamma_7$ and $\gamma_8$ are phase rotations applied to $LTF_{dRU26,8}$ and $LTF_{dRU26,9}$, respectively; $\gamma_9$ and $\gamma_{10}$ are phase rotations applied to $LTF_{dRU52,1}$ and $LTF_{dRU52,2}$, respectively, and $LTF_{add\_tones\_1}$ are LTF values on the 2 additional tones of $LTF_{dRU106,1}$; $\gamma_{11}$ and $\gamma_{12}$ are phase rotations applied to $LTF_{dRU52,3}$ and $LTF_{dRU52,4}$, respectively, and $LTF_{add\_tones\_2}$ are LTF values on the 2 additional tones of $LTF_{dRU106,2}$. As shown in the equations above, various LTF values may be initially assigned to the smallest-sized base sequences (such as $LTF_{dRU26,1}$-$LTF_{dRU26,9}$) which are then inherited, hierarchically, by larger-sized base sequences (such as $LTF_{dRU52,1}$-$LTF_{dRU52,4}$, $LTF_{dRU106,1}$, and $LTF_{dRU106,2}$) through the application of various phase rotations (such as $\gamma_1$-$\gamma_{14}$, each having a value of +1 or −1). Thus, the smallest-sized base sequences used to construct an LTF sequence associated with a given spreading bandwidth may be referred to herein as the "initial base sequences." For larger base sequences that are not integer multiples of smaller base sequences (such as $LTF_{dRU106,1}$-$LTF_{dRU106,2}$), other LTF values may be assigned to the additional tones. Aspects of the present disclosure recognize that, while 26-tone initial base sequences may be suitable for constructing LTF sequences associated with a 20 MHz, 40 MHz, or 80 MHz spreading bandwidth, larger initial base sequences (such as 52-tone base sequences) may be better suited as the initial base sequences for constructing LTF sequences associated with an 80 MHz or larger spreading bandwidths (because transmitting a 26-tone dRU over an 80 MHz spreading bandwidth may be an inefficient use of the available spectrum).

In some aspects, the LTF sequence associated with a particular spreading bandwidth may be optimized through careful selection of the initial base sequences ($LTF^0$), the phase rotations ($\gamma$), and the LTF values assigned to the additional tones ($LTF_{add\_tones}$). For example, an optimal LTF sequence may minimize the worst case PAPR associated with each dRU that can be transmitted over the spreading bandwidth. In some implementations, the LTF sequence may be globally optimized over all initial base sequences, all phase rotations, and all LTF values assigned to the additional tones. In such implementations, the worst case PAPR may be assessed for every permutation of $LTF^0$, $\gamma$, and $LTF_{add\_tones}$, and selecting the permutation of $LTF^0$, $\gamma$, and $LTF_{add\_tones}$ that yields the lowest worst case PAPR over all dRUs in a given spreading BW. In some other implementations, the LTF sequence maybe optimized per dRU size, for example, according to a layer-by-layer analysis. In such implementations, a set of initial base sequences that yields the lowest worst case PAPR among all permutations of such base sequences is determined at the first layer of analysis, and a set of larger base sequences that yields the lowest worst case PAPR among all permutations of such base sequences is determined at each subsequent layer of analysis, for example, by varying $\gamma$ or $LTF_{add\_tones}$.

Aspects of the present disclosure recognize that the locations of pilot tones in a dRU (or the spreading bandwidth) also affect the PAPR associated with the transmission of the dRU. Pilot tones are used for phase alignment and parameter tracking. In some aspects, larger dRUs may inherent their pilot tone locations from multiple smaller dRUs according to a hierarchical structure. In other words, the pilot tone locations for all dRUs of various sizes may be inherited from the pilot tone locations associated with one or more 26-tone dRUs (P26). For example, a 52-tone dRU may inherit its pilot tone locations (P52) from two 26-tone dRUs (P52=2*P26), a 106-tone dRU may inherit its pilot tone locations (P106) from two 52-tone dRUs that are down-sampled by a factor of 2 (P106=½(2*P52)), a 242-tone dRU may inherit its pilot tone locations (P242) from two 106-tone dRUs (P242=2*P106), and a 484-tone dRU may inherit its pilot tone locations (P484) from two 242-tone dRUs (P282=2*P242).

In some implementations, pilot tones may be placed within dRUs of various sizes and locations based on dRU LTF sequence design. In such implementations, the relative pilot tone locations within a dRU may be designed to reduce the worst case PAPR associated with the dRU. For example, the PAPR associated with a 106-tone (or larger) dRU may be mitigated through the selection of down-sampled pilot tone locations associated with 106-tone dRUs. Tables 1-3 provide examples of relative pilot tone locations (dP26, dP52, dP106, dP242, and dP484) associated with various dRUs (dRU26, dRU52, dRU106, dRU242, and dRU484, respectively) that can be transmitted over 20 MHz, 40 MHZ, and 80 MHZ bandwidths, respectively, where the pilot tones associated each 106-tone dRU (dRU106) are selected to mitigate PAPR. Tables 4-6 provide example subcarrier indices that map to the relative pilot tone locations shown in Tables 1-3, respectively.

TABLE 1

Relative Pilot Tone Indices for dRU in 20 MHz (start tone index is 1)

| dRU26, i = 1:9 | dP26-1 (2, 15) | dP26-2 (4, 17) | dP26-3 (3, 16) | dP26-4 (5, 18) | dP26-5 (6, 20) | dP26-6 (8, 21) | dP26-7 (10, 23) | dP26-8 (9, 22) | dP26-9 (11, 25) |
|---|---|---|---|---|---|---|---|---|---|
| dRU52, i = 1:4 | dP52-1 sort([dP26_1 dP26_2]) | | dP52-2 sort([dP26_3 dP26_4]) | | | dP52-3 sort([dP26_6 dP26_7]) | | dP52-4 sort([dP26_8 dP26_9]) | |
| dRU106, i = 2 | dP106-1 dP52_1 | | | | | dP106-2 dP52_4 | | | |

TABLE 2

Relative Pilot Tone Indices for dRU in 40 MHz (start tone index is 1)

| dRU26, i = 1:18 | dP26_1 (2, 15) dP26_10 (5, 18) | dP26_2 (7, 20) dP26_11 (10, 23) | dRU3 (3, 16) dP26_12 (6, 19) | dP26_4 (8, 21) dP26_13 (11, 24) | dP26_5 (9, 22) dP26_14 (4, 17) | dP26_6 (8, 21) dP26_15 (11, 24) | dP26_7 (2, 15) dP26_16 (5, 18) | dP26_8 (9, 22) dP26_17 (12, 25) | dP26_9 (3, 16) dP26_18 (6, 19) |
|---|---|---|---|---|---|---|---|---|---|
| dRU52, i = 1:8 | dP52_1 sort([dP26_1 dP26_2]) dP52_5 sort([dP26_10 dP26_11]) | | dP52_2 sort([dP26_3 dP26_4]) dP52_6 sort([dP26_12 dP26_13]) | | | dP52_3 sort([dP26_6 dP26_7]) dP52_7 sort([dP26_15 dP26_16]) | | dP52_4 sort([dP26_8 dP26_9]) dP52_8 sort([dP26_17 dP26_18]) | |
| dRU106, i = 1:4 | dP106_1 sort([dP52_1([1, 3]) dP52_2([2, 4])]) dP106_3 sort([dP52_5([1, 3]) dP52_6([2, 4])]) | | | | | dP106_2 dP52_3 dP106_4 dP52_8 | | | |
| dRU242, i = 1:2 | dP242_1 [dP106_1 dP106_2] dP242_2 [dP106_3 dP106_4] | | | | | | | | |

TABLE 3

Relative Pilot Tone Indices for dRU in 80 MHz (start tone index is 1)

| | | | | | | | | | |
|---|---|---|---|---|---|---|---|---|---|
| dRU26, i = 1:37 | dP26_1 [2, 15] | dP26_2 [4, 17] | dP26_3 [3, 16] | dP26_4 [5, 18] | dP26_5 [6, 19] | dP26_6 [8, 21] | dP26_7 [10, 23] | dP26_8 [9, 22] | dP26_9 [11, 24] |
| | dP26_10 [11, 24] | dP26_11 [2, 15] | dP26_12 [12, 25] | dP26_13 [3, 16] | dP26_14 [9, 22] | dP26_15 [5, 18] | dP26_16 [7, 20] | dP26_17 [6, 19] | dP26_18 [8, 21] |
| | dP26_20 [9, 22] | dP26_21 [11, 24] | dP26_22 [10, 23] | dP26_23 [12, 25] | dP26_24 [2, 15] | dP26_25 [4, 17] | dP26_26 [6, 19] | dP26_27 [5, 18] | dP26_28 [7, 20] |
| | dP26_29 [7, 20] | dP26_30 [9, 22] | dP26_31 [8, 21] | dP26_32 [10, 23] | dP26_33 [5, 18] | dP26_34 [12, 25] | dP26_35 [3, 16] | dP26_36 [2, 15] | dP26_37 [4, 17] |
| dRU52, i = 1:16 | dP52_1 sort([dP26_1 dP26_2]) | | dP52_2 sort([dP26_3 dP26_4]) | | dP52_3 sort([dP26_6 dP26_7]) | | dP52_4 sort([dP26_8 dP26_9]) | | |
| | dP52_5 sort([dP26_10 dP26_11]) | | dP52_6 sort([dP26_12 dP26_13]) | | dP52_7 sort([dP26_15 dP26_16]) | | dP52_8 sort([dP26_17 dP26_18]) | | |
| | dP52_9 sort([dP26_20 dP26_21]) | | dP52_10 sort([dP26_22 dP26_23]) | | dP52_11 sort([dP26_25 dP26_26]) | | dRU12 sort([dP26_27 dP26_28]) | | |
| | dP52_13 sort([dP26_29 dP26_30]) | | dP52_14 sort([dP26_31 dP26_32]) | | dP52_15 sort([dP26_34 dP26_35]) | | dP52_16 sort([dP26_36 dP26_37]) | | |
| dRU106, i = 1:8 | dP106_1 dP52_2 dP106_3 dP52_6 dP106_5 sort([dP52_9([1, 3]) dP52_10([2, 4])]) dP106_7 sort([dP52_13([1, 3]) dP52_14([2, 4])]) | | | | dP106_2 dP52_3 dP106_4 sort([dP52_7([2, 4]) dP52_8([1, 3])]) dP106_6 dP52_11 dP106_8 sort([dP52_15([1, 3]) dP52_16([2, 4])]) | | | | |
| dRU242, i = 1:4 | | | | dP242_1 [dP106_1 dP106_2] dP242_2 [dP106_3 dP106_4] dP242_3 [dP106_5 dP106_6] dP242_4 [dP106_7 dP106_8] | | | | | |
| dRU484, i = 1:2 | | | | dP484_1 [dP242_1 dP242_2] dP484_2 [dP242_3 dP242_4] | | | | | |

TABLE 4

Pilot indices for dRU transmission over 20 MHz (20-3)

| dRU size | Subcarrier Indices |
|---|---|
| dRU26, i = 1:9 | {−111 15}, {−89 37}, {−100 26}, {−78 48}, {−67 59}, {−56 70}, {−34 92}, {−45 81}, {−23 103} |
| dRU52, i = 1:4 | {−111 −89 15 37}, {−100 −78 26 48}, {−56 −34 70 92}, {−45 −23 81 103} |
| dRU106, i = 1:2 | {−111 −89 15 37}, {−45 −23 81 103} |

TABLE 5

Pilot indices for dRU transmission over 40 MHz (40-2)

| dRU size | Subcarrier Indices |
|---|---|
| dRU26, i = 1:18 | {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116} |
| dRU52, i = 1:8 | {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215} |
| dRU106, i = 1:4 | {−224 −103 28 149}, {−213 −114 39 138}, {−169 −48 83 204}, {−136 −37 116 215} |
| dRU242, i = 1:2 | {−224 −213 −114 −103 28 39 138 149}, { −169 −136 −48 −37 83 116 204 215}, |

TABLE 6

Pilot indices for dRU transmission over 80 MHz (80-2)

| dRU size | Subcarrier Indices |
|---|---|
| dRU52, i = 1:16 | {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, {−260 −172 240 328}, {−216 −128 284 372}, {−392 −84 108 416}, {−436 −348 64 152} |
| dRU106, i = 1:8 | {−403 −315 97 185}, {−227 −139 273 361}, {−381 −73 119 427}, {−293 −249 207 251}, {−194 −62 306 438}, {−370 −282 130 218}, {−260 −128 240 372}, {−392 −348 108 152} |

TABLE 6-continued

Pilot indices for dRU transmission over 80 MHz (80-2)

| dRU size | Subcarrier Indices |
|---|---|
| dRU242, i = 1:4 | {−403 −315 −227 −139 97 185 273 361}, |
| | {−381 −293 −249 −73 119 207 251 427}, |
| | {−370 −282 −194 −62 130 218 306 438}, |
| | {−392 −348 −260 −128 108 152 240 372} |
| dRU484, i = 1:2 | {−403 −381 −315 −293 −249 −227 −139 |
| | −73 97 119 185 207 251 273 361 427}, |
| | {−392 −370 −348 −282 −260 −194 −128 |
| | −62 108 130 152 218 240 306 372 438} |

In some other implementations, dRU LTF sequences may be designed based on the placement of pilot tones within dRUs of various sizes and locations. Aspects of the present disclosure recognize that dRUs having the same size, but different tone mapping patterns, or different relative pilot tone locations, may have different optimal base sequences. On the other hand, dRUs having the same size, tone mapping pattern, relative pilot tone locations, and LTF values may exhibit the same PAPR regardless of the location of the dRU in the spreading bandwidth (or dRU index). Aspects of the present disclosure also recognize that four different base sequences (S1-S4) may yield the same PAPR given the same dRU size, tone mapping pattern, and relative pilot tone locations. For example, base sequences S1 and S2 may differ only in the values of their pilot tones. In other words, the LTF values S1 and S2 outside of the pilot tone locations may be identical. Further, base sequences S1 and S3 may have different even-tone LTF values for the first 13 tones and different odd-tone LTF values for the second 13 tones. In other words, the values of S1 are the opposite (negative) of the values of S3 on tones 2, 4, 6, 8, 10, 12, 15, 17, 19, 21, 23 and 25. Still further, the base sequence S3 and S4 may differ only in the values of their pilot tones (similar to S1 and S2).

Aspects of the present disclosure further recognize that larger base sequences constructed from different smaller base sequences generally yield lower PAPR than larger base sequences constructed from the same smaller base sequences. Thus, in some implementations, the PAPR associated with an LTF sequence may be optimized by combining different base sequences yielding low PAPR (such as S1 and S2) to construct larger base sequences. Tables 7-9 provide examples of relative pilot tone locations (dP26, dP52, dP106, dP242, and dP484) associated with various dRUs (dRU26, dRU52, dRU106, dRU242, and dRU484, respectively) that can be transmitted over 20 MHz, 40 MHZ, and 80 MHz bandwidths, respectively, where the pilot tones associated each 106-tone dRU (dRU106) are selected independent of PAPR considerations. Tables 10-12 provide example subcarrier indices that map to the relative pilot tone locations shown in Tables 7-9, respectively.

TABLE 7

Relative Pilot Tone Indices for dRU in 20 MHz (start tone index is 1) with fixed 11ax rRU106 pilot selection for dRU106

| dRU26, | dP26-1 | dP26-2 | dP26-3 | dP26-4 | dP26-5 | dP26-6 | dP26-7 | dP26-8 | dP26-9 |
|---|---|---|---|---|---|---|---|---|---|
| i = 1:9 | (2, 15) | (4, 17) | (3, 16) | (5, 18) | (6, 20) | (8, 21) | (10, 23) | (9, 22) | (11, 25) |
| dRU52, | dP52-1 | | dP52-2 | | | dP52-3 | | dP52-4 | |
| i = 1:4 | sort([dP26_1 dP26_2]) | | sort([dP26_3 dP26_4]) | | | sort([dP26_6 dP26_7]) | | sort([dP26_8 dP26_91]) | |
| dRU106, | dP106-1 | | | | | dP106-2 | | | |
| i = 2 | sort([dP52_1([1, 3]) dP52_2([2, 4])]) | | | | | sort([dP52_3([1, 3]) dP52_4([2, 4])]) | | | |

TABLE 8

Relative Pilot Tone Indices for dRU in 40 MHz (start tone index is 1) with fixed 11ax rRU106 pilot selection for dRU106

| dRU26, | dP26_1 | dP26_2 | dRU3 | dP26_4 | dP26_5 | dP26_6 | dP26_7 | dP26_8 | dP26_9 |
|---|---|---|---|---|---|---|---|---|---|
| i = 1:18 | (2, 15) | (7, 20) | (3, 16) | (8, 21) | (9, 22) | (8, 21) | (2, 15) | (9, 22) | (3, 16) |
| | dP26_10 | dP26_11 | dP26_12 | dP26_13 | dP26_14 | dP26_15 | dP26_16 | dP26_17 | dP26_18 |
| | (5, 18) | (10, 23) | (6, 19) | (11, 24) | (4, 17) | (11, 24) | (5, 18) | (12, 25) | (6, 19) |
| dRU52, | dP52_1 | | dP52_2 | | | dP52_3 | | dP52_4 | |
| i = 1:8 | sort([dP26_1 dP26_2]) | | sort([dP26_3 dP26_4]) | | | sort([dP26_6 dP26_7]) | | sort([dP26_8 dP26_9]) | |
| | dP52_5 | | dP52_6 | | | dP52_7 | | dP52_8 | |
| | sort([dP26_10 dP26_11]) | | sort([dP26_12 dP26_13]) | | | sort([dP26_15 dP26_16]) | | sort([dP26_17 dP26_18]) | |
| dRU106, | dP106_1 | | | | | dP106_2 | | | |
| i = 1:4 | sort([dP52_1([1, 3]) dP52_2([2, 4])]) | | | | | sort([dP52_3([1, 3]) dP52_4([2, 4])]) | | | |
| | dP106_3 | | | | | dP106_4 | | | |
| | sort([dP52_5([1, 3]) dP52_6([2, 4])]) | | | | | sort([dP52_7([1, 3]) dP52_8([2, 4])]) | | | |
| dRU242, | dP242_1 | | | | | | | | |
| i = 1:2 | [dP106_1 dP106_2] | | | | | | | | |
| | dP242_2 | | | | | | | | |
| | [dP106_3 dP106_4] | | | | | | | | |

TABLE 9

Relative Pilot Tone Indices for dRU in 80 MHz (start tone index is 1) with fixed 11ax rRU106 pilot selection for dRU106

| dRU26, i = 1:37 | dP26_1 [2, 15] | dP26_2 [4, 17] | dP26_3 [3, 16] | dP26_4 [5, 18] | dP26_5 [6, 19] | dP26_6 [8, 21] | dP26_7 [10, 23] | dP26_8 [9, 22] | dP26_9 [11, 24] |
|---|---|---|---|---|---|---|---|---|---|
| | dP26_10 [11, 24] | dP26_11 [2, 15] | dP26_12 [12, 25] | dP26_13 [3, 16] | dP26_14 [9, 22] | dP26_15 [5, 18] | dP26_16 [7, 20] | dP26_17 [6, 19] | dP26_18 [8, 21] |
| | dP26_20 [9, 22] | dP26_21 [11, 24] | dP26_22 [10, 23] | dP26_23 [12, 25] | dP26_24 [2, 15] | dP26_25 [4, 17] | dP26_26 [6, 19] | dP26_27 [5, 18] | dP26_28 [7, 20] |
| | dP26_29 [7, 20] | dP26_30 [9, 22] | dP26_31 [8, 21] | dP26_32 [10, 23] | dP26_33 [5, 18] | dP26_34 [12, 25] | dP26_35 [3, 16] | dP26_36 [2, 15] | dP26_37 [4, 17] |
| dRU52, i = 1:16 | dP52_1 sort([dP26_1 dP26_2]) | | dP52_2 sort([dP26_3 dP26_4]) | | dP52_3 sort([dP26_6 dP26_7]) | | dP52_4 sort([dP26_8 dP26_9]) | | |
| | dP52_5 sort([dP26_10 dP26_11]) | | dP52_6 sort([dP26_12 dP26_13]) | | dP52_7 sort([dP26_15 dP26_16]) | | dP52_8 sort([dP26_17 dP26_18]) | | |
| | dP52_9 sort([dP26_20 dP26_21]) | | dP52_10 sort([dP26_22 dP26_23]) | | dP52_11 sort([dP26_25 dP26_26]) | | dP52_12 sort([dP26_27 dP26_28]) | | |
| | dP52_13 sort([dP26_29 dP26_30]) | | dP52_14 sort([dP26_31 dP26_32]) | | dP52_15 sort([dP26_34 dP26_35]) | | dP52_16 sort([dP26_36 dP26_37]) | | |
| dRU106, i = 1:8 | dP106_1 sort([dP52_1([1, 3]) dP52_2([2, 4])]) | | | | dP106_2 sort([dP52_3([1, 3]) dP52_4([2, 4])]) | | | | |
| | dP106_3 sort([dP52_5([1, 3]) dP52_6([2, 4])]) | | | | dP106_4 sort([dP52_7([1, 3]) dP52_8([2, 4])]) | | | | |
| | dP106_5 sort([dP52_9([1, 3]) dP52_10([2, 4])]) | | | | dP106_6 sort([dP52_11([1, 3]) dP52_12([2, 4])]) | | | | |
| | dP106_7 sort([dP52_13([1, 3]) dP52_14([2, 4])]) | | | | dP106_8 sort([dP52_15([1, 3]) dP52_16([2, 4])]) | | | | |
| dRU242, i = 1:4 | | | | dP242_1 [dP106_1 dP106_2] | | | | | |
| | | | | dP242_2 [dP106_3 dP106_4] | | | | | |
| | | | | dP242_3 [dP106_5 dP106_6] | | | | | |
| | | | | dP242_4 [dP106_7 dP106_8] | | | | | |
| dRU484, i = 1:2 | | | | dP484_1 [dP242_1 dP242_2] | | | | | |
| | | | | dP484_2 [dP242_3 dP242_4] | | | | | |

TABLE 10

Pilot indices for dRU transmission over 20 MHz (20-3) with fixed 11ax rRU106 pilot selection for dRU106

| dRU size | Subcarrier Indices |
|---|---|
| dRU26, i = 1:9 | {−111 15}, {−89 37}, {−100 26}, {−78 48}, {−67 59}, {−56 70}, {−34 92}, {−45 81}, {−23 103} |
| dRU52, i = 1:4 | {−111 −89 15 37}, {−100 −78 26 48}, {−56 −34 70 92}, {−45 −23 81 103} |
| dRU106, i = 1:2 | {−111 −78 15 48}, {−56 −23 70 103} |

TABLE 11

Pilot indices for dRU transmission over 40 MHz (40-2) with fixed 11ax rRU106 pilot selection for dRU106

| dRU size | Subcarrier Indices |
|---|---|
| dRU26, i = 1:18 | {−224 28}, {−125 127}, {−202 50}, {−103 149}, {−81 171}, {−114 138}, {−213 39}, {−92 160}, {−191 61}, {−169 83}, {−70 182}, {−147 105}, {−48 204}, {−180 72}, {−59 193}, {−158 94}, {−37 215}, {−136 116} |
| dRU52, i = 1:8 | {−224 −125 28 127}, {−202 −103 50 149}, {−213 −114 39 138}, {−191 −92 61 160}, {−169 −70 83 182}, {−147 −48 105 204}, {−158 −59 94 193}, {−136 −37 116 215} |
| dRU106, i = 1:4 | {−224 −103 28 149}, {−213 −92 39 160}, {−169 −48 83 204}, {−158 −37 94 215} |
| dRU242, i = 1:2 | {−224 −213 −103 −92 28 39 149 160}, {−169 −158 −48 −37 83 94 204 215} |

TABLE 12

Pilot indices for dRU transmission over 80 MHz (80-2) with fixed 11ax rRU106 pilot selection for dRU106

| dRU size | Subcarrier Indices |
|---|---|
| dRU52, i = 1:16 | {−447 −359 53 141}, {−403 −315 97 185}, {−227 −139 273 361}, {−183 −95 317 405}, {−425 −117 75 383}, {−381 −73 119 427}, {−337 −249 163 251}, {−293 −205 207 295}, {−194 −106 306 394}, {−150 −62 350 438}, {−370 −282 130 218}, {−326 −238 174 262}, |

TABLE 12-continued

Pilot indices for dRU transmission over 80 MHz (80-2) with fixed
11ax rRU106 pilot selection for dRU106

| dRU size | Subcarrier Indices |
|---|---|
| dRU106, i = 1:8 | {−260 −172 240 328}, {−216 −128 284 372},<br>{−392 −84 108 416}, {−436 −348 64 152}<br>{−447 −315 53 185}, {−227 −95 273 405},<br>{−425 −73 75 427}, {−337 −205 163 295},<br>{−194 −62 306 438}, {−370 −238 130 262},<br>{−260 −128 240 372}, {−392 −348 108 152} |
| dRU242, i = 1:4 | {−447 −315 −227 −95 53 185 273 405},<br>{−425 −337 −205 −73 75 163 295 427},<br>{−370 −238 −194 −62 130 262 306 438},<br>{−392 −348 −260 −128 108 152 240 372} |
| dRU484, i = 1:2 | {−447 −425 −337 −315 −227 −205 −95<br>−73 53 75 163 185 273 295 405 427},<br>{−392 −370 −348 −260 −238 −194 −128<br>−62 108 130 152 240 262 306 372 438} |

With reference for example to Table 9, dRU26_4, dRU26_15, dRU26_27, and dRU26_33 have the same relative pilot tone locations (5, 18). Thus, as described above, four different base sequences (S1-S4) may yield the same PAPR for any of dRU26_4, dRU26_15, dRU26_27, or dRU26_33. Example suitable base sequences S1-S4 include:
S1: 1 1 1 1 1 1 −1 −1 −1 −1 1 1 −1 −1 −1 1 −1 1 −1 1 −1
1 1 −1 −1 1
S2: 1 1 1 1 −1 1 −1 −1 −1 −1 1 1 −1 −1 −1 1 −1 −1 −1
1 −1 1 1 −1 −1 1
S3: 1 −1 1 −1 1 −1 −1 1 −1 1 1 −1 −1 −1 1 1 1 1 1 1
1 −1 −1 1 1
S4: 1 −1 1 −1 −1 −1 −1 1 −1 1 1 −1 −1 −1 1 1 1 −1 1 1
1 1 −1 −1 1 1
In the example above, each of the base sequences S1-S4 is associated with a worst-case PAPR equal to 3.4435 dB when mapped to any of dRU26_4, dRU26_15, dRU26_27, or dRU26_33. In some implementations, each of the base sequences S1-S4 may be assigned to a respective one of dRU26_4, dRU26_15, dRU26_27, or dRU26_33 when constructing larger base sequences, for example, to optimize PAPR associated with the larger base sequences.

Figure 14:
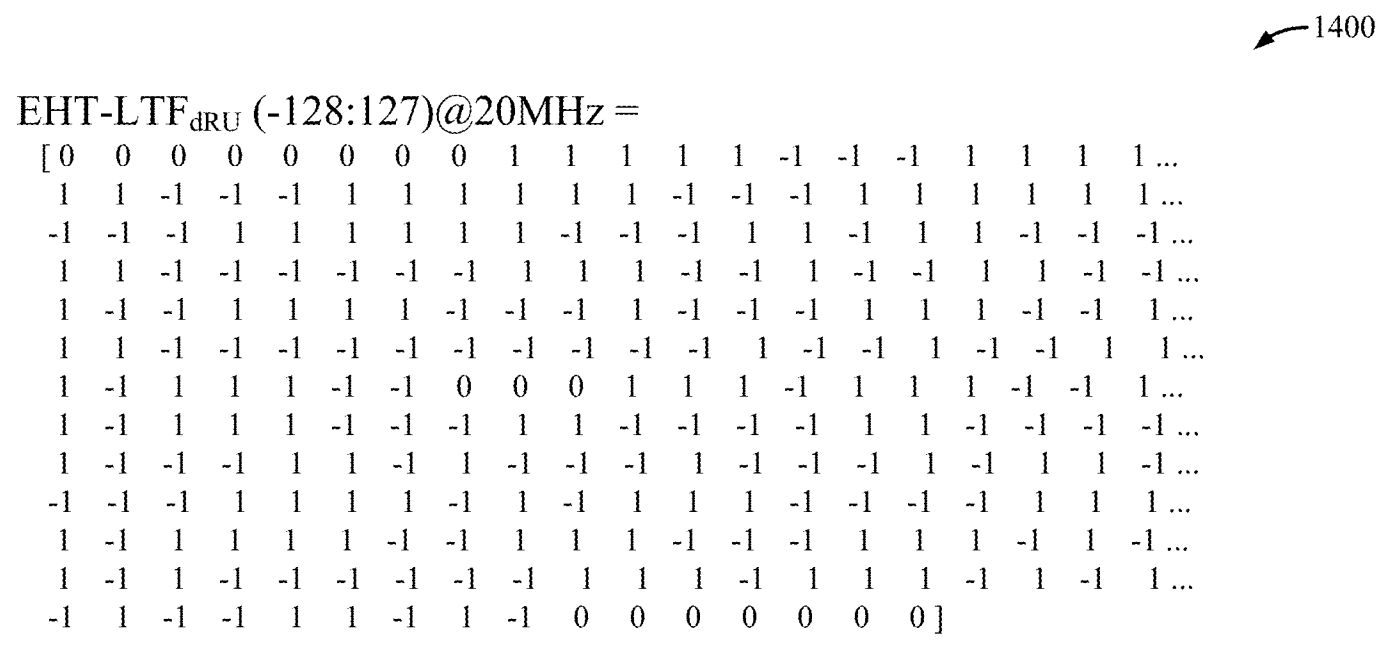

FIG. 14 shows an example LTF sequence 1400 usable for distributed transmissions over a 20 MHz spreading bandwidth, according to some implementations. As shown in FIG. 14, the LTF sequence 1400 is modulated in accordance with a BPSK modulation scheme, where each modulated tone carries an LTF value equal to +1 or −1 and zeroes represent null tones. In some implementations, the LTF sequence 1400 may be constructed based on the criteria described above with reference to FIG. 13. Thus, compared to an existing LTF sequence associated with a 20 MHz bandwidth, the LTF sequence 1400 may significantly reduce the PAPR associated with the transmission of any suitable dRU over the 20 MHz spreading bandwidth. For example, using the LTF sequence 1400 in combination with the LTF tone mapping of FIG. 13 may result in a 2 dB reduction in PAPR compared to the LTF tone mapping of FIG. 10.

Figure 15:
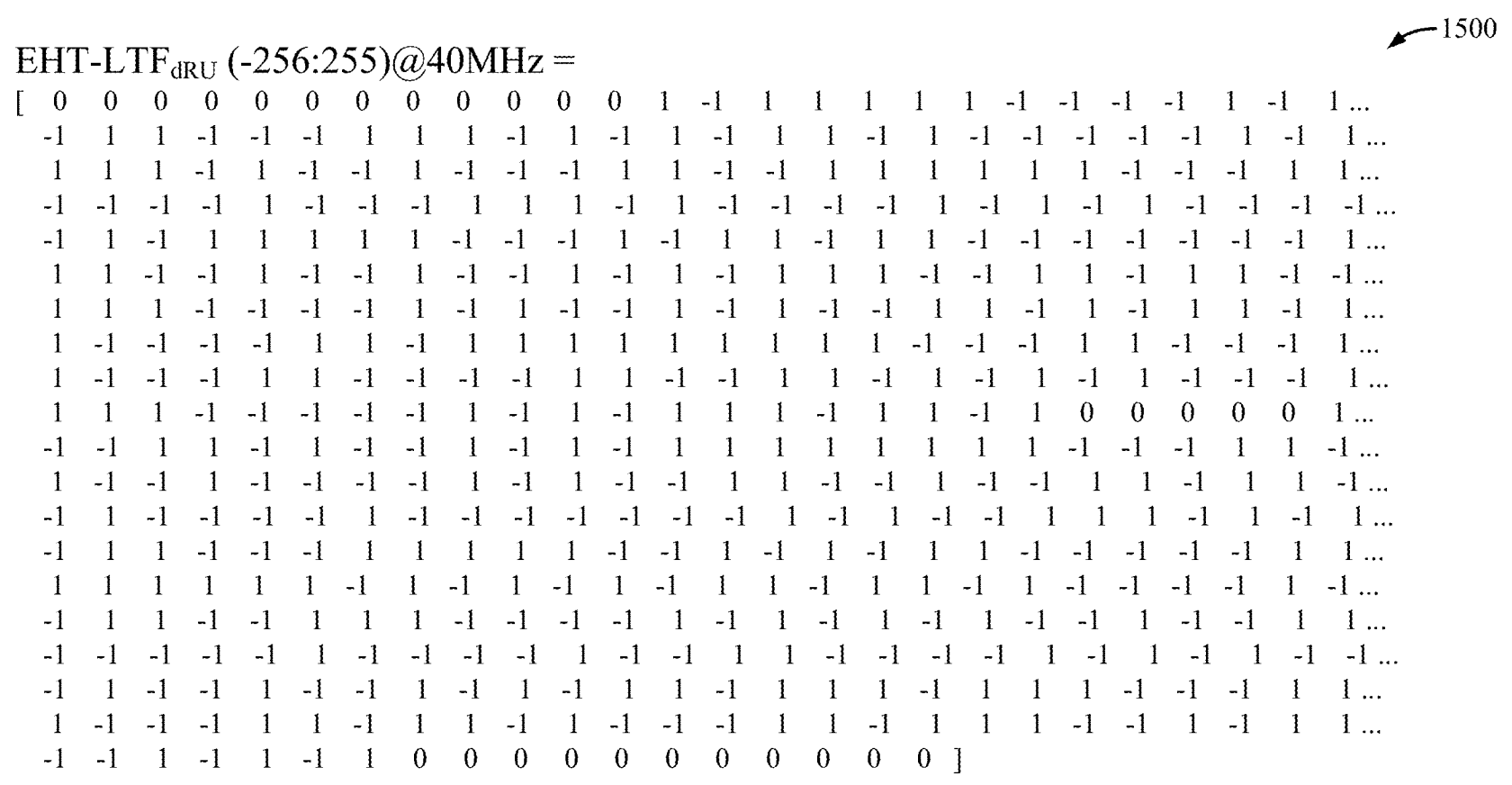

FIG. 15 shows an example LTF sequence 1500 usable for distributed transmissions over a 40 MHz spreading bandwidth, according to some implementations. As shown in FIG. 15, the LTF sequence 1500 is modulated in accordance with a BPSK modulation scheme, where each modulated tone carries an LTF value equal to +1 or −1 and zeroes represent null tones. In some implementations, the LTF sequence 1500 may be constructed based on the criteria described above with reference to FIG. 13. Thus, compared to an existing LTF sequence associated with a 40 MHz bandwidth (such as the LTF sequence 1100 of FIG. 11), the LTF sequence 1500 may significantly reduce the PAPR associated with the transmission of any suitable dRU over the 40 MHz spreading bandwidth. For example, using the LTF sequence 1500 in combination with the LTF tone mapping of FIG. 13 may result in a >1 dB reduction in PAPR compared to the LTF tone mapping of FIG. 10.

FIG. 16 shows an example LTF sequence 1600 usable for distributed transmissions over an 80 MHz spreading bandwidth, according to some implementations. As shown in FIG. 16, the LTF sequence 1600 is modulated in accordance with a BPSK modulation scheme, where each modulated tone carries an LTF value equal to +1 or −1 and zeroes represent null tones. In some implementations, the LTF sequence 1600 may be constructed based on the criteria described above with reference to FIG. 13. Thus, compared to an existing LTF sequence associated with an 80 MHz bandwidth, the LTF sequence 1600 may significantly reduce the PAPR associated with the transmission of any suitable dRU over the 80 MHz spreading bandwidth. For example, using the LTF sequence 1600 in combination with the LTF tone mapping of FIG. 13 may result in a >1 dB reduction in PAPR compared to the LTF tone mapping of FIG. 10.

In some aspects, a dRU may be transmitted over a partial (or punctured) PPDU bandwidth. In other words, the spreading bandwidth of the dRU may be smaller than the PPDU bandwidth indicated in the bandwidth field of the PPDU. For a punctured 80 MHZ PPDU bandwidth, the dRU spreading bandwidth may include 20 MHz and 40 MHz sub-bands of the PPDU bandwidth. For a 160 MHz or 320 MHz PPDU bandwidth, the dRU spreading bandwidth may include an 80 MHz sub-band of the PPDU bandwidth. In some implementations, when mapping LTF values to dRU tones according to the LTF tone mapping of FIG. 13, the LTF sequence may be determined based on the spreading bandwidth associated with a punctured PPDU bandwidth. For example, the LTF sequences associated with the 20 MHz and 40 MHz bandwidths are used to derive the LTF values for a dRU transmitted over a punctured 80 MHz PPDU bandwidth. Similarly, the LTF sequence associated with the 80 MHz bandwidth is used to derive the LTF values for a dRU transmitted over a 160 MHz or 320 MHz PPDU bandwidth.

In some implementations, when mapping LTF values to dRU tones according to the LTF tone mapping of FIG. 10, the LTF sequence may be determined based on the PPDU bandwidth (regardless of puncturing). For example, the existing LTF sequences associated with the 80 MHz bandwidth is used to derive the LTF values for a dRU transmitted over a punctured 80 MHz PPDU bandwidth. Similarly, the existing LTF sequence associated with the 160 MHz or 320 MHz bandwidth is used to derive the LTF values for a dRU transmitted over a 160 MHz or 320 MHz PPDU bandwidth, respectively. In some other implementations, when mapping LTF values to dRU tones according to the LTF tone mapping of FIG. 10, the LTF sequence may be determined based on the spreading bandwidth associated with a punctured PPDU bandwidth. For example, the existing LTF sequences associated with the 20 MHz and 40 MHz bandwidths are used to derive the LTF values for a dRU transmitted over a punctured 80 MHz PPDU bandwidth. Similarly, the existing LTF sequence associated with the 80 MHz bandwidth is used to derive the LTF values for a dRU transmitted over a 160 MHz or 320 MHz PPDU bandwidth.

Figure 17:
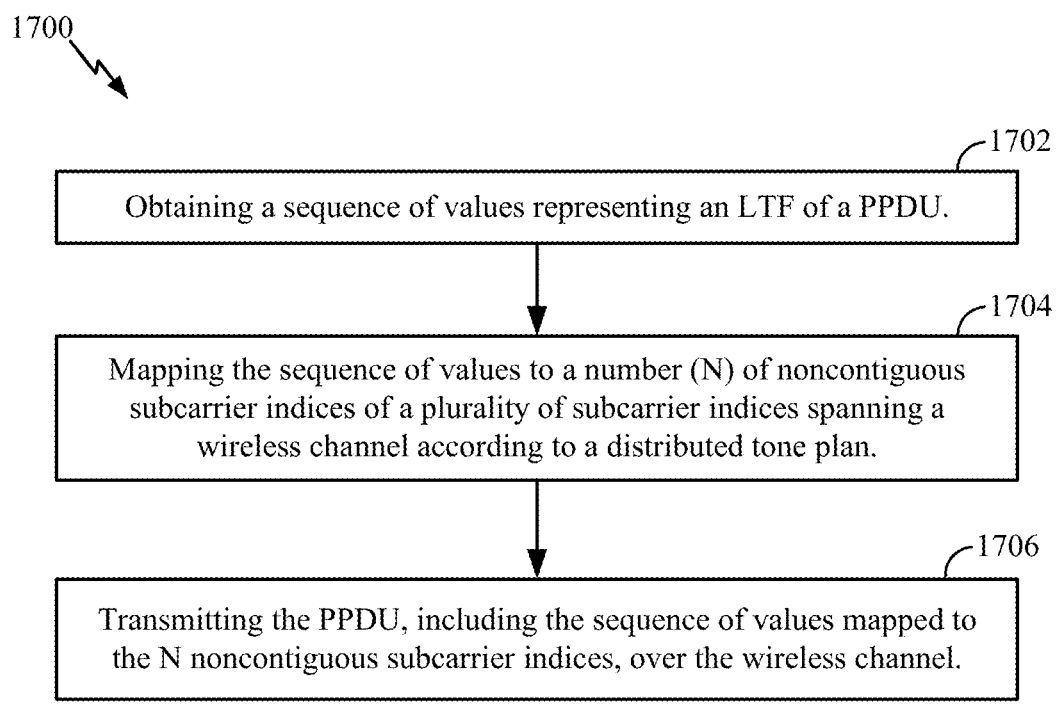
FIG. 17 shows a flowchart illustrating an example process for wireless communication that supports LTFs in distributed transmissions according to some implementations.

FIG. 17 shows a flowchart illustrating an example process 1700 for wireless communication that supports LTFs in distributed transmissions according to some implementations. In some implementations, the process 1700 may be performed by a wireless communication device operating as or within an AP, such as one of the APs 102 or 502 described above with reference to FIGS. 1 and 5A, respectively. In some other implementations, the process 1700 may be performed by a wireless communication device operating as or within a network node, such as one of the STAs 104 or 504 described above with reference to FIGS. 1 and 5B, respectively.

In some implementations, the process 1700 begins in block 1702 with obtaining a sequence of values representing an LTF of a PPDU. In block 1704, the process 1700 proceeds with mapping the sequence of values to a number (N) of noncontiguous subcarrier indices of a plurality of subcarrier indices spanning a wireless channel according to a distributed tone plan. In block 1706, the process 1700 proceeds with transmitting the PPDU, including the sequence of values mapped to the N noncontiguous subcarrier indices, over the wireless channel.

In some aspects, the mapping of the sequence of values to the N noncontiguous subcarrier indices may include modulating the sequence of values on N tones representing a logical RU associated with a non-distributed tone plan and mapping the N tones to the N noncontiguous subcarrier indices, respectively. In some implementations, the sequence of values may be an LTF sequence associated with the non-distributed tone plan. In some implementations, the non-distributed tone plan may be a legacy tone plan. In some other implementations, the non-distributed tone plan may be a non-legacy tone plan.

In some aspects, the sequence of values may be configured for transmission on an N-tone distributed RU (dRU) based on a peak-to-average power ratio (PAPR) associated with the transmission of the dRU. In some aspects, the sequence of values may be obtained based on relative locations of the N noncontiguous subcarrier indices in the wireless channel. In some implementations, the sequence of values may be a subset of an LTF sequence that maps to the plurality of subcarrier indices according to a non-distributed tone plan. In some other implementations, the sequence of values may be a subset of an LTF sequence that maps to the plurality of subcarrier indices according to the distributed tone plan.

In some aspects, the LTF sequence may include one or more 26-tone base sequences each configured for transmission on a respective 26-tone dRU based on a PAPR associated with a transmission of the LTF sequence. In some implementations, portions of the LTF sequence that map to 26-tone dRUs may have the same relative pilot tone locations are associated with different base sequences. In some implementations, the one or more 26-tone base sequences ($LTF_{dRU26}$) may form larger base sequences associated with the LTF sequence, where:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence; where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRU52,1}$ and $LTF_{dRU52,2}$, respectively), and $LTF_{add\_tones}$ are LTF values on additional tones of a 106-tone base sequence ($LTF_{dRU106}$), based on the PAPR associated with the transmission of the LTF sequence.

Figure 18:
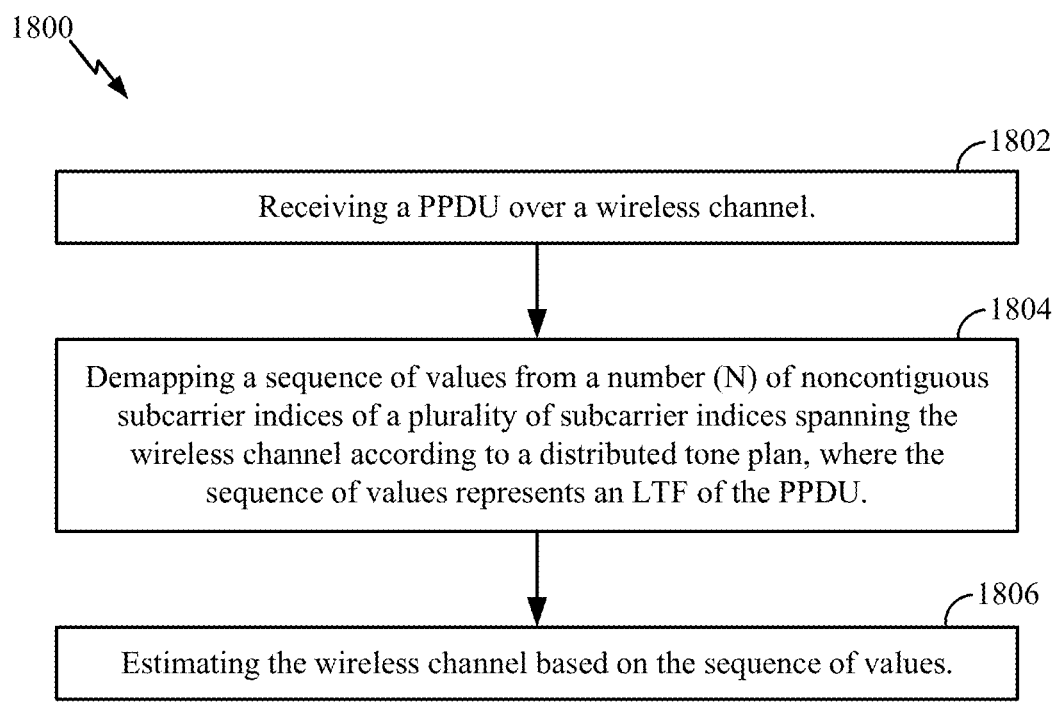
FIG. 18 shows a flowchart illustrating an example process for wireless communication that supports LTFs in distributed transmissions according to some implementations.

FIG. 18 shows a flowchart illustrating an example process 1800 for wireless communication that supports LTFs in distributed transmissions according to some implementations. In some implementations, the process 1800 may be performed by a wireless communication device operating as or within an AP, such as one of the APs 102 or 502 described above with reference to FIGS. 1 and 5A, respectively. In some other implementations, the process 1800 may be performed by a wireless communication device operating as or within a network node, such as one of the STAs 104 or 504 described above with reference to FIGS. 1 and 5B, respectively.

In some implementations, the process 1800 begins in block 1802 with receiving a PPDU over a wireless channel. In block 1804, the process 1800 proceeds with demapping a sequence of values from a number (N) of noncontiguous subcarrier indices of a plurality of subcarrier indices spanning the wireless channel according to a distributed tone plan, where the sequence of values represents an LTF of the PPDU. In block 1806, the process 1800 proceeds with estimating the wireless channel based on the sequence of values.

In some aspects, the demapping of the sequence of values may include demapping N tones from the N noncontiguous subcarrier indices, respectively, where the demapped N tones represent a logical RU associated with a non-distributed tone plan; and demodulating the sequence of values from the N tones. In some implementations, the sequence of values may be an LTF sequence associated with the non-distributed tone plan. In some implementations, the non-distributed tone plan may be a legacy tone plan. In some other implementations, the non-distributed tone plan may be a non-legacy tone plan.

In some aspects, the sequence of values may be configured for transmission on an N-tone dRU based on a PAPR associated with the transmission of the dRU. In some aspects, the sequence of values may be associated with relative locations of the N noncontiguous subcarrier indices in the wireless channel. In some implementations, the sequence of values may be a subset of an LTF sequence that maps to the plurality subcarrier indices according to a non-distributed tone plan. In some other implementations, the sequence of values may be a subset of an LTF sequence that maps to the plurality of subcarrier indices according to the distributed tone plan.

In some aspects, the LTF sequence may include one or more 26-tone base sequences each configured for transmission on a respective 26-tone dRU based on a PAPR associated with a transmission of the LTF sequence. In some implementations, portions of the LTF sequence that map to 26-tone dRUs having the same relative pilot tone locations may be associated with different base sequences. In some implementations, the one or more 26-tone base sequences ($LTF_{dRU26}$) may form larger base sequences associated with the LTF sequence, where:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence; where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRU52,1}$ and $LTF_{dRUS2,2}$, respectively), and $LTF_{add\_tones}$ are LTF values on additional tones of a 106-tone base sequence ($LTF_{dRU106}$), based on the PAPR associated with the transmission of the LTF sequence.

Figure 19:
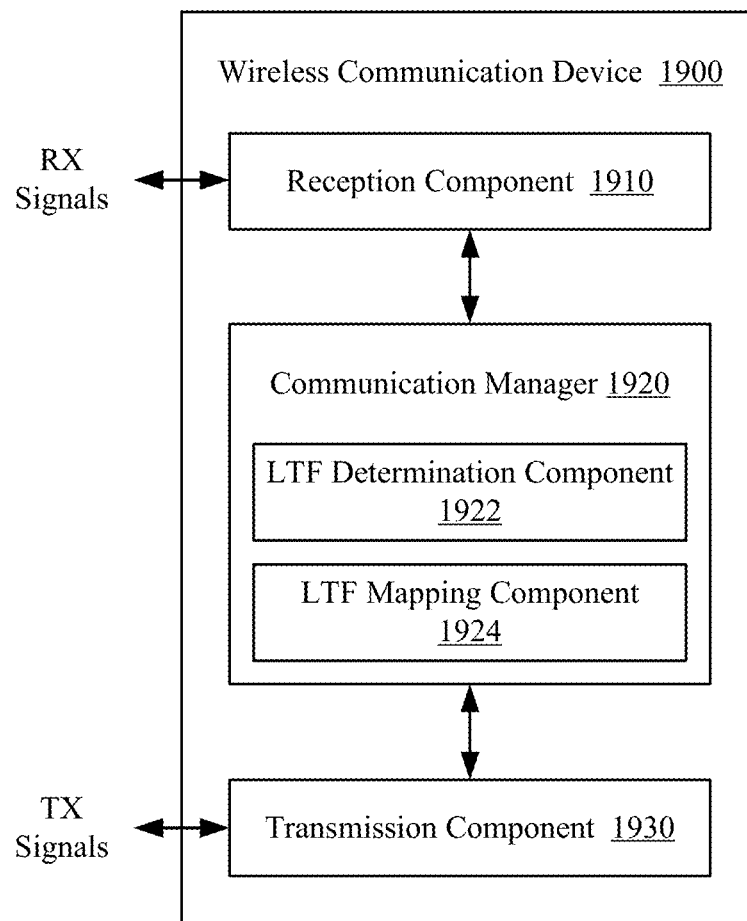
FIG. 19 shows a block diagram of an example wireless communication device according to some implementations.

FIG. 19 shows a block diagram of an example wireless communication device 1900 according to some implementations. In some implementations, the wireless communication device 1900 is configured to perform the process 1700 described above with reference to FIG. 17. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes an LTF determination component 1922 and an LTF mapping component 1924. Portions of one or more of the components 1922 and 1924 may be implemented at least in part in hardware or firmware. In some implementations, at least some of the components 1922 or 1924 are implemented at least in part as software stored in a memory (such as the memory 408). For example, portions of one or more of the components 1922 and 1924 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. The communication manager 1920 is configured to control or manage communications with one or more other wireless communication devices. In some implementations, the LTF determination component 1922 may obtain a sequence of values representing an LTF of a PPDU; and the LTF mapping component 1924 may map the sequence of values to a number (N) of noncontiguous subcarrier indices of a plurality of subcarrier indices spanning a wireless channel according to a distributed tone plan. The transmission component 1930 is configured to transmit TX signals, over a wireless channel, to one or more other wireless communication devices. In some implementations, the transmission component 1930 may transmit the PPDU, including the sequence of values mapped to the N noncontiguous subcarrier indices, over the wireless channel.

Figure 20:
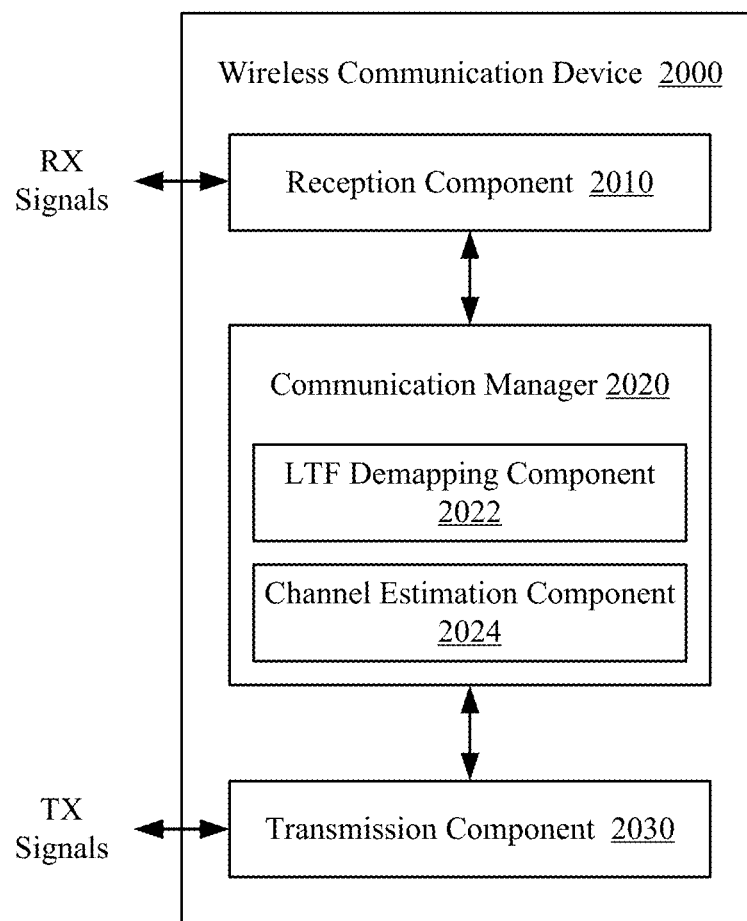
FIG. 20 shows a block diagram of an example wireless communication device according to some implementations.

FIG. 20 shows a block diagram of an example wireless communication device 2000 according to some implementations. In some implementations, the wireless communication device 2000 is configured to perform the process 1800 described above with reference to FIG. 18. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes an LTF demapping component 2022 and a channel estimation component 2024. Portions of one or more of the components 2022 and 2024 may be implemented at least in part in hardware or firmware. In some implementations, at least some of the components 2022 or 2024 are implemented at least in part as software stored in a memory (such as the memory 408). For example, portions of one or more of the components 2022 and 2024 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. In some implementations, the reception component 2010 may receive a PPDU over a wireless channel. The communication manager 2020 is configured to control or manage communications with one or more other wireless communication devices. In some implementations, the LTF demapping component 2022 may demap a sequence of values from a number (N) of noncontiguous subcarrier indices of a plurality of subcarrier indices spanning the wireless channel according to a distributed tone plan, where the sequence of values represents an LTF of the PPDU; and the channel estimation component 2024 may estimate the wireless channel based on the sequence of values. The transmission component 2030 is configured to transmit TX signals, over a wireless channel, to one or more other wireless communication devices.

Implementation examples are described in the following numbered clauses:

1. A method for wireless communication by a wireless communication device, including:
   obtaining a sequence of values representing a long training field (LTF) of a physical (PHY) layer convergence protocol (PLCP) protocol data unit (PPDU);
   mapping the sequence of values to a number (N) of noncontiguous subcarrier indices of a plurality of subcarrier indices spanning a wireless channel according to a distributed tone plan; and
   transmitting the PPDU, including the sequence of values mapped to the N noncontiguous subcarrier indices, over the wireless channel.

2. The method of clause 1, where the mapping of the sequence of values to the N noncontiguous subcarrier indices includes:
   modulating the sequence of values on N tones representing a logical resource unit (RU) associated with a non-distributed tone plan; and
   mapping the N tones to the N noncontiguous subcarrier indices, respectively.

3. The method of any of clauses 1 or 2, where the sequence of values is an LTF sequence associated with the non-distributed tone plan.

4. The method of any of clauses 1-3, where the non-distributed tone plan is a legacy tone plan.
5. The method of any of clauses 1-3, where the non-distributed tone plan is a non-legacy tone plan.
6. The method of clause 1, where the sequence of values is configured for transmission on an N-tone distributed RU (dRU) based on a peak-to-average power ratio (PAPR) associated with the transmission of the dRU.
7. The method of any of clauses 1 or 6, where the sequence of values is obtained based on relative locations of the N noncontiguous subcarrier indices in the wireless channel.
8. The method of any of clauses 1, 6, or 7, where the sequence of values is a subset of an LTF sequence that maps to the plurality of subcarrier indices according to a non-distributed tone plan.
9. The method of any of clauses 1, 6, or 7, where the sequence of values is a subset of an LTF sequence that maps to the plurality of subcarrier indices according to the distributed tone plan.
10. The method of any of clauses 1, 6, 7, or 9, where the LTF sequence comprises one or more 26-tone base sequences each configured for transmission on a respective 26-tone dRU based on a PAPR associated with a transmission of the LTF sequence.
11. The method of any of clauses 1, 6, 7, 9, or 10, where portions of the LTF sequence that map to 26-tone dRUs having the same relative pilot tone locations are associated with different base sequences.
12. The method of any of clauses 1, 6, 7, or 9-11, where the one or more 26-tone base sequences ($LTF_{dRU26}$) form larger base sequences associated with the LTF sequence, where:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence;

where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRUS2,1}$ and $LTF_{dRUS2,2}$, respectively), and $LTF_{add\_tones}$ are LTF values on additional tones of a 106-tone base sequence ($LTF_{dRU106}$), based on the PAPR associated with the transmission of the LTF sequence.

13. A wireless communication device including:
    at least one processor; and
    at least one memory communicatively coupled with the at least one processor and storing processor-readable code that, when executed by the at least one processor, is configured to perform the method of any one or more of clauses 1-12.

14. A method for wireless communication performed by a wireless communication device, including:
    receiving a physical layer (PHY) convergence protocol (PLCP) protocol data unit (PPDU) over a wireless channel;
    demapping a sequence of values from a number (N) of noncontiguous subcarrier indices of a plurality of subcarrier indices spanning the wireless channel according to a distributed tone plan, the sequence of values representing a long training field (LTF) of the PPDU; and
    estimating the wireless channel based on the sequence of values.

15. The method of clause 14, where the demapping of the sequence of values includes:
    demapping N tones from the N noncontiguous subcarrier indices, respectively, the demapped N tones representing a logical resource unit (RU) associated with a non-distributed tone plan; and
    demodulating the sequence of values from the N tones.

16. The method of any of clauses 14 or 15, where the sequence of values is an LTF sequence associated with the non-distributed tone plan.
17. The method of any of clauses 14-16, the non-distributed tone plan is a legacy tone plan.
18. The method of any of clauses 14-16, where the non-distributed tone plan is a non-legacy tone plan.
19. The method of clause 14, where the sequence of values is configured for transmission on an N-tone distributed RU (dRU) based on a peak-to-average power ratio (PAPR) associated with the transmission of the dRU.
20. The method of any of clauses 14 or 19, where the sequence of values is associated with relative locations of the N noncontiguous subcarrier indices in the wireless channel.
21. The method of any of clauses 14, 19, or 20, where the sequence of values is a subset of an LTF sequence that maps to the plurality subcarrier indices according to a non-distributed tone plan.
22. The method of any of clauses 14, 19, or 20, where the sequence of values is a subset of an LTF sequence that maps to the plurality of subcarrier indices according to the distributed tone plan.
23. The method of any of clauses 14, 19, 20, or 22, where the LTF sequence comprises one or more 26-tone base sequences each configured for transmission on a respective 26-tone dRU based on a PAPR associated with a transmission of the LTF sequence.
24. The method of any of clauses 14, 19, 20, 22, or 23, where portions of the LTF sequence that map to 26-tone dRUs having the same relative pilot tone locations are associated with different base sequences.
25. The method of any of clauses 14, 19, 20, 22-24, where the one or more 26-tone base sequences ($LTF_{dRU26}$) form larger base sequences associated with the LTF sequence, where:

$$LTF_{dRU52,1} = \gamma_1 * LTF_{dRU26,1} + \gamma_2 * LTF_{dRU26,2}$$

$$LTF_{dRU52,2} = \gamma_3 * LTF_{dRU26,3} + \gamma_4 * LTF_{dRU26,4}$$

$$LTF_{dRU106} = \gamma_5 * LTF_{dRU52,1} + \gamma_6 * LTF_{dRU52,2} + LTF_{add\_tones}$$

where $\gamma_1$ and $\gamma_2$ are phase rotations applied to first and second 26-tone base sequences ($LTF_{dRU26,1}$ and $LTF_{dRU26,2}$, respectively) based on the PAPR associated with the transmission of the LTF sequence;

where $\gamma_3$ and $\gamma_4$ are phase rotations applied to third and fourth 26-tone base sequences ($LTF_{dRU26,3}$ and $LTF_{dRU26,4}$, respectively) based on the PAPR associated with the transmission of the LTF sequence; and where $\gamma_5$ and $\gamma_6$ are phase rotations applied to first and second 52-tone base sequences ($LTF_{dRU52,1}$ and $LTF_{dRU52,2}$, respectively), and $LTF_{add\_tones}$ are LTF values on additional tones of a 106-tone base sequence ($LTF_{dRU106}$), based on the PAPR associated with the transmission of the LTF sequence.

26. A wireless communication device including:
   at least one processor; and
   at least one memory communicatively coupled with the at least one processor and storing processor-readable code that, when executed by the at least one processor, is configured to perform the method of any one or more of clauses 14-25.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device, comprising:
   at least one processor; and
   at least one memory communicatively coupled with the at least one processor and storing processor-readable code that, when executed by the at least one processor, is configured to cause the wireless communication device to:
      map a sequence of values representative of a long training field (LTF) of a physical (PHY) layer convergence protocol (PLCP) protocol data unit (PPDU) to a plurality of noncontiguous subcarrier indices of a plurality of subcarrier indices spanning a wireless channel according to a distributed tone plan, wherein the sequence of values is a subset of an LTF sequence that comprises one or more 26-tone base sequences, wherein the one or more 26-tone base sequences form larger base sequences associated with the LTF sequence, and wherein the larger base sequences comprise a first 52-tone base sequence, a second 52-tone base sequence, and a 106-tone base sequence; and
      transmit the PPDU via the wireless channel, the PPDU comprising the sequence of values mapped to the plurality of noncontiguous subcarrier indices.

2. The wireless communication device of claim 1, wherein the LTF sequence maps to the plurality of subcarrier indices according to the distributed tone plan.

3. The wireless communication device of claim 2, wherein the one or more 26-tone base sequences are each configured for transmission on a respective 26-tone distributed resource unit (dRU) based on a peak-to-average power ratio (PAPR) associated with a transmission of the LTF sequence.

4. The wireless communication device of claim 3, wherein portions of the LTF sequence that map to 26-tone dRUs having same relative pilot tone locations are associated with different base sequences.

5. The wireless communication device of claim 3, wherein the first 52-tone base sequence corresponds to $LTF_{dRU52,1}$, the second 52-tone base sequence corresponds to $LTF_{dRU52,2}$, and the 106-tone base sequence corresponds to $LTF_{dRU106}$, and wherein:

$$LTF_{dRU52,1} = \gamma_1 * LTF_{dRU26,1} + \gamma_2 * LTF_{dRU26,2};$$

$$LTF_{dRU52,2} = \gamma_3 * LTF_{dRU26,3} + \gamma_4 * LTF_{dRU26,4}; \text{ and}$$

$$LTF_{dRU106} = \gamma_5 * LTF_{dRU52,1} + \gamma_6 * LTF_{dRU52,2} + LTF_{add\_tones}.$$

6. The wireless communication device of claim 5, wherein:
- $\gamma_1$ and $\gamma_2$ are phase rotations applied to a first 26-tone base sequence ($LTF_{dRU26,1}$) and a second 26-tone base sequence ($LTF_{dRU26,2}$), respectively, based on the PAPR associated with the transmission of the LTF sequence;
- $\gamma_3$ and $\gamma_4$ are phase rotations applied to a third 26-tone base sequence ($LTF_{dRU26,3}$) and a fourth 26-tone base sequence ($LTF_{dRU26,4}$), respectively, based on the PAPR associated with the transmission of the LTF sequence; and
- $\gamma_5$ and $\gamma_6$ are phase rotations applied to the first 52-tone base sequence ($LTF_{dRU52,1}$) and the second 52-tone base sequence ($LTF_{dRU52,2}$), respectively, based on the PAPR associated with the transmission of the LTF sequence.

7. The wireless communication device of claim 5, wherein $LTF_{add\_tones}$ are LTF values on additional tones of the 106-tone base sequence ($LTF_{dRU106}$), based on the PAPR associated with the transmission of the LTF sequence.

8. The wireless communication device of claim 1, wherein the sequence of values is based on relative locations of the plurality of noncontiguous subcarrier indices in the wireless channel.

9. The wireless communication device of claim 1, wherein the LTF sequence maps to the plurality of subcarrier indices according to a non-distributed tone plan.

10. The wireless communication device of claim 1, wherein, to map the sequence of values to the plurality of noncontiguous subcarrier indices, the processor-readable code, when executed by the at least one processor, is configured to cause the wireless communication device to:
- modulate the sequence of values on a plurality of tones representative of a logical resource unit (RU) associated with a non-distributed tone plan; and
- map the plurality of tones to the plurality of noncontiguous subcarrier indices, respectively.

11. The wireless communication device of claim 1, wherein the sequence of values is configured for transmission on an N-tone distributed resource unit (dRU) based on a peak-to-average power ratio (PAPR) associated with a transmission of the dRU.

12. A wireless communication device, comprising:
- at least one processor; and
- at least one memory communicatively coupled with the at least one processor and storing processor-readable code that, when executed by the at least one processor, is configured to cause the wireless communication device to:
  - receive a physical layer (PHY) convergence protocol (PLCP) protocol data unit (PPDU) via a wireless channel; and
  - demap a sequence of values representative of a long training field (LTF) of the PPDU from a plurality of noncontiguous subcarrier indices of a plurality of subcarrier indices spanning the wireless channel according to a distributed tone plan, wherein the sequence of values is a subset of an LTF sequence that comprises one or more 26-tone base sequences, wherein the one or more 26-tone base sequences form larger base sequences associated with the LTF sequence, and wherein the larger base sequences comprise a first 52-tone base sequence, a second 52-tone base sequence, and a 106-tone base sequence.

13. The wireless communication device of claim 12, wherein the processor-readable code, when executed by the at least one processor, is configured to cause the wireless communication device to:
- estimate the wireless channel based on the sequence of values.

14. The wireless communication device of claim 12, wherein the LTF sequence maps to the plurality of subcarrier indices according to the distributed tone plan.

15. The wireless communication device of claim 14, wherein the one or more 26-tone base sequences are each configured for transmission on a respective 26-tone distributed resource unit (dRU) based on a peak-to-average power ratio (PAPR) associated with a transmission of the LTF sequence.

16. The wireless communication device of claim 15, wherein portions of the LTF sequence that map to 26-tone dRUs having same relative pilot tone locations are associated with different base sequences.

17. The wireless communication device of claim 15, wherein the first 52-tone base sequence corresponds to $LTF_{dRU52,1}$, the second 52-tone base sequence corresponds to $LTF_{dRU52,2}$, and the 106-tone base sequence corresponds to $LTF_{dRU106}$, and wherein:

$$LTF_{dRU52,1} = \gamma_1 * LTF_{dRU26,1} + \gamma_2 * LTF_{dRU26,2};$$

$$LTF_{dRU52,2} = \gamma_3 * LTF_{dRU26,3} + \gamma_4 * LTF_{dRU26,4}; \text{ and}$$

$$LTF_{dRU106} = \gamma_5 * LTF_{dRU52,1} + \gamma_6 * LTF_{dRU52,2} + LTF_{add\_tones}.$$

18. The wireless communication device of claim 17, wherein:
- $\gamma_1$ and $\gamma_2$ are phase rotations applied to a first 26-tone base sequence ($LTF_{dRU26,1}$) and a second 26-tone base sequence ($LTF_{dRU26,2}$), respectively, based on the PAPR associated with the transmission of the LTF sequence;
- $\gamma_3$ and $\gamma_4$ are phase rotations applied to a third 26-tone base sequence ($LTF_{dRU26,3}$) and a fourth 26-tone base sequence ($LTF_{dRU26,4}$), respectively, based on the PAPR associated with the transmission of the LTF sequence; and
- $\gamma_5$ and $\gamma_6$ are phase rotations applied to the first 52-tone base sequence ($LTF_{dRU52,1}$ and the second 52-tone base sequence ($LTF_{dRU52,2}$), respectively, based on the PAPR associated with the transmission of the LTF sequence.

19. The wireless communication device of claim 17, wherein $LTF_{add\_tones}$ are LTF values on additional tones of the 106-tone base sequence ($LTF_{dRU106}$), based on the PAPR associated with the transmission of the LTF sequence.

20. The wireless communication device of claim 12, wherein the sequence of values is based on relative locations of the plurality of noncontiguous subcarrier indices in the wireless channel.

* * * * *